(12) United States Patent
Kang et al.

(10) Patent No.: US 12,149,140 B2
(45) Date of Patent: Nov. 19, 2024

(54) ELECTRIC MOTOR ASSEMBLY

(71) Applicant: LG Electronics Inc., Seoul (KR)

(72) Inventors: Joohang Kang, Seoul (KR); Hyeonho Ha, Seoul (KR); Yongdae Kim, Seoul (KR); Jin Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/342,351

(22) Filed: Jun. 27, 2023

(65) Prior Publication Data

US 2023/0344297 A1 Oct. 26, 2023

Related U.S. Application Data

(63) Continuation of application No. 17/406,691, filed on Aug. 19, 2021, now Pat. No. 11,728,706.

(30) Foreign Application Priority Data

Oct. 7, 2020 (KR) .......................... 10-2020-0129510

(51) Int. Cl.
*H02K 3/34* (2006.01)
*H02K 1/14* (2006.01)
(Continued)

(52) U.S. Cl.
CPC ............. *H02K 3/345* (2013.01); *H02K 1/146* (2013.01); *H02K 3/34* (2013.01); *H02K 3/522* (2013.01); *H02K 9/06* (2013.01)

(58) Field of Classification Search
CPC .......... H02K 9/06; H02K 1/146; H02K 1/148; H02K 1/141; H02K 3/34; H02K 3/345;
(Continued)

(56) References Cited

U.S. PATENT DOCUMENTS

2008/0093940 A1 4/2008 Boischio
2015/0137637 A1* 5/2015 Jang ...................... H02K 3/522
29/598
(Continued)

FOREIGN PATENT DOCUMENTS

CN 105610273 5/2016
JP 5601799 10/2014
(Continued)

OTHER PUBLICATIONS

Myungkeun Yoo, Fan Motor, Aug. 25, 2020, KR 20200099853 (English Machine Translation) (Year: 2019).*
(Continued)

*Primary Examiner* — Alexander A Singh
(74) *Attorney, Agent, or Firm* — Fish & Richardson P.C.

(57) ABSTRACT

An electric motor assembly includes a stator and a rotor configured to rotate relative to the stator. The stator includes a stator core including a yoke that has a ring shape and a plurality of teeth radially coupled to an inner surface of the yoke, a stator coil that is wound around the stator core, and an insulator disposed between the stator core and the stator coil. The insulator includes a yoke insulator that is coupled to the yoke with a first coupling tolerance defined between the yoke insulator and the plurality of tooth insulators, and a plurality of tooth insulators that are coupled to the plurality of teeth, respectively, with a second coupling tolerance defined between the yoke and the plurality of teeth. The first coupling tolerance is less than the second coupling tolerance.

19 Claims, 25 Drawing Sheets

(51) Int. Cl.
*H02K 3/52* (2006.01)
*H02K 9/06* (2006.01)

(58) Field of Classification Search
CPC .......... H02K 3/522; H02K 7/14; H02K 11/33; H02K 3/24; H02K 21/16; H02K 2203/12; H02K 2211/03; H02K 2213/03; H02K 1/04; H02K 3/32; H02K 3/325; H02K 3/38; H02K 15/00; H02K 15/0081; H02K 15/02; H02K 15/06
USPC ................................................. 310/214, 215
See application file for complete search history.

(56) References Cited

U.S. PATENT DOCUMENTS

| | | |
|---|---|---|
| 2018/0366997 A1 | 12/2018 | Mentec et al. |
| 2020/0395806 A1 | 12/2020 | Kim et al. |
| 2020/0412196 A1 * | 12/2020 | Horii ...................... H02K 1/187 |
| 2021/0021171 A1 | 1/2021 | Hong et al. |
| 2022/0109348 A1 | 4/2022 | Kang et al. |

FOREIGN PATENT DOCUMENTS

| | | | |
|---|---|---|---|
| JP | 2015006030 | | 1/2015 |
| JP | 2017046381 | | 3/2017 |
| JP | 2019069759 | | 5/2019 |
| KR | 20200099853 | * | 2/2020 |
| TW | 201131943 | | 9/2011 |
| WO | WO 2015/114752 | | 8/2015 |

OTHER PUBLICATIONS

Fujimori Takuya, Rotary Electric Machine, Jan. 8, 2015, JP 2015006030 (English Machine Translation) (Year: 2015).

Office Action in Australian Appln. No. 2021240321, dated Nov. 7, 2022, 7 pages.

Office Action in Taiwanese Appln. No. 110130662, dated Aug. 9, 2022, 23 pages (with English translation).

* cited by examiner

ELECTRIC MOTOR ASSEMBLY

CROSS-REFERENCE TO RELATED APPLICATIONS

This application is a continuation of U.S. application Ser. No. 17/406,691, filed on Aug. 19, 2021, which claims the benefit of the earlier filing date and the right of priority to Korean Patent Application No. 10-2020-0129510, filed on Oct. 7, 2020, the contents of which are incorporated by reference herein in their entirety.

TECHNICAL FIELD

The present disclosure relates to an electric motor assembly.

BACKGROUND

A motor or electric motor is a device that can convert electric energy into mechanical energy. For example, an electric motor may include a stator and a rotor disposed to be rotatable relative to the stator. A motor may be used in a handheld device such as a hair dryer and a vacuum cleaner. In some examples, the size and weight of the motor may be reduced for the hair dryer and the vacuum cleaner to be held and used in one or both hands of a user.

In some cases, an electric motor assembly of the handheld device may be manufactured with a reduced size and weight in consideration of the convenience of use, and a high-speed operation of a rotor of the electric motor assembly may maintain an air volume and/or air velocity of the handheld device.

In some cases, the electric motor assembly of the handheld device may reduce an increase in vibration during the high-speed operation and noise generation due to the increase in the vibration. However, in some cases, where the size of the electric motor assembly is reduced, a gap between teeth of the stator core may be reduced in proportion to the size reduction, which may make it difficult to wind the stator coil. This may put a limit to reducing the size of the electric motor assembly.

In some cases, electric motor assemblies may include a split core manufactured by dividing a stator core into a yoke part and a tooth part and use a method of coupling the tooth part to the yoke part after winding the stator coil around the tooth part. In some cases, it may be difficult to maintain concentricity when coupling the tooth part to the yoke part after the stator coil winding. In some cases, noise may be generated due to electromagnetic force imbalance between the tooth part and the rotor caused by uneven concentricity of the tooth part.

When coupling the tooth part to the yoke part after the stator coil winding, a width of a contact area between the yoke part and the tooth part may be relatively small compared to a length of the tooth part. As a result, transverse displacement of the tooth part may occur when an external force in a transverse direction acts on the tooth part. Further, the transverse displacement of the tooth part may lead to an increase in vibration and noise of the tooth part.

In some cases, electric motor assemblies include a stator body having a cylindrical shape and a plurality of mounting holes spaced apart from each other along a circumferential direction, a plurality of stator cores respectively coupled to the plurality of mounting holes of the stator body along a radial direction, and a plurality of coils respectively wound on the plurality of stator cores. However, it may be difficult to maintain concentricity of ends of the plurality of stator cores.

Moreover, a variation of a gap (air gap) defined between the ends of the plurality of stator cores and a rotor may increases, and a magnetic force acting between the stator and the rotor may be unbalanced, which may decrease a motor output. In some cases, an axial size of the stator may be increased to reduce a radial size of the stator. Accordingly, the stator has a long axial length relative to its diameter, which may increase the variation of the gap (air gap) between the stator and the rotor.

In some cases, each of the plurality of stator cores may have a "C" cross-sectional shape and have two ends disposed to face the rotor, and four stator cores may be coupled to four mounting holes to form eight poles, which may make it difficult to increase the number of rotations of the motor. This may eventually lead to a decrease in air volume and an increase in size of the impeller to maintain the same air volume.

In some cases, the stator and/or the rotor may have a long axial length (stacking thickness of the stator) relative to its diameter, and a flow resistance of air passing between the stator and the rotor when the impeller rotates may be increased. This may increase the noise during operation of the handheld device and decrease the air volume through the handheld device.

SUMMARY

The present disclosure describes an electric motor assembly that can reduce the external size and facilitate winding of a stator coil.

The present disclosure also describes an electric motor assembly that can suppress electromagnetic force imbalance caused by uneven concentricity of teeth.

The present disclosure further describes an electric motor assembly that can allow a yoke and teeth to be easily coupled to each other.

The present disclosure further describes an electric motor assembly that can suppress generation of vibration and noise caused by transverse displacement of teeth.

The present disclosure further describes an electric motor assembly that can guide assembly of a yoke and a tooth by assembly of a yoke insulator coupled to the yoke and a tooth insulator coupled to the tooth to thereby prevent interference in assembly between the yoke and the tooth.

The present disclosure further describes an electric motor assembly that can reduce the size of an impeller in the same air volume by increasing the number of rotations of a rotor.

In order to achieve these and other advantages and in accordance with the purpose of this specification, the present disclosure describes an electric motor assembly. For example, the electric motor assembly includes a stator core provided with a yoke having a ring shape and a plurality of teeth coupled to the yoke in a radial direction, and an insulator provided with a yoke insulator that insulates the yoke and a plurality of tooth insulators that respectively insulate the plurality of teeth. The electric motor assembly further includes a stator coil can be wound around each of the plurality of tooth insulators. Accordingly, an external size of the stator can be reduced, and winding of the stator coil can be easily performed.

In some implementations, a first coupling tolerance between the yoke insulator and the plurality tooth insulators can be less than a second coupling tolerance between the yoke and the plurality of teeth. This can allow the plurality of teeth to be easily coupled to the yoke. More specifically, a first coupling tolerance can be defined between the yoke insulator and each tooth insulator, and a second coupling tolerance can be formed between the yoke and each tooth. The first coupling tolerance can be less (smaller) than the second coupling tolerance.

When the tooth insulator is coupled to the yoke insulator, the tooth can be guided to be assembled in a correct position with respect to the yoke. Accordingly, friction and interference between the yoke and the plurality of teeth can be suppressed, allowing the yoke and the plurality of teeth to be smoothly coupled to each other.

In some examples, the plurality of teeth can be three teeth. The stator core can be configured such that three teeth and three slots are alternately arranged.

In some implementations, the stator core can have a thin thickness (axial length) relative to its diameter (outer diameter) to thereby reduce flow resistance of air passing between the stator and the rotor when an impeller rotates. Accordingly, the generation of noise due to movement of air during operation can be suppressed, and a decrease in air volume caused by an increase in flow resistance can be suppressed or reduced.

As the axial length of the stator and the rotor are reduced, flow resistance can be reduced, and the air volume can be increased accordingly. This can result in reducing the size of the impeller.

In some implementations, an outer diameter (rotation diameter) of the impeller can be similar to the outer diameter of the stator core. The stator coil can be configured as concentrated winding that is intensively wound around the plurality of teeth. The stator coil can include three coil parts wound around the three teeth, respectively.

For examples, in the stator coil, the three coil parts can be respectively connected to each phase (U phase, V phase, and W phase) of a three-phase AC power supply.

In some implementations, each of the plurality of teeth can have an insertion end portion formed at one end thereof to be inclined inward, and the yoke can include insertion end accommodating parts in which the insertion end portions of the plurality of teeth are respectively inserted in an axial direction. In some examples, each of the insertion end portions can have a dovetail shape, and the insertion end accommodating parts can each be implemented as a dovetail groove. This can restrict separation of the plurality of teeth along a radial direction of the yoke. This can also restrict the plurality of teeth from being pulled radially inward, and the concentricity of inner ends of the plurality of teeth can be stably maintained. As a result, an air gap between the rotor rotatably disposed inside the plurality of teeth and the teeth can be constant or uniform.

With this configuration, electromagnetic force imbalance between the plurality of teeth and the rotor can be suppressed, and generation of noise caused by the electromagnetic force imbalance can be suppressed or reduced.

In some implementations, the rotor can include a rotating shaft and a permanent magnet coupled to a circumference of the rotating shaft. For examples, the permanent magnet can have a cylindrical shape. The permanent magnet can have an axial length equal to an axial length (stacking thickness) of the stator core. In some examples, the permanent magnet can have an axial length (overhang) slightly greater than an axial length of the stator core.

In some examples, the permanent magnet can have different magnetic poles (N poles and S poles) alternately arranged along a circumferential direction. The permanent magnet can have two poles having different magnetic poles (N pole and S pole). With this configuration, the number of poles of the rotor can be relatively small, which can be advantageous to increase the number of rotations, enabling the rotor to be rotated at a high speed (e.g., 110 krpm to 180 krpm).

In some implementations, the yoke can include a plurality of coupling protrusions that protrude from an inner surface thereof along a radial direction and are respectively disposed on both sides of each of the plurality of teeth. Based on a coupling force between the yoke and the plurality of teeth, an outer diameter of the yoke can be reduced. In some examples, the insertion end accommodating part can have both side wall surfaces formed in the plurality of coupling protrusions, respectively.

In some implementations, a thickness between the insertion end accommodating part and an outer surface of the yoke can be less than a thickness of the yoke. This can allow the outer diameter of the yoke to be further reduced.

In some implementations, the plurality of coupling protrusions can each include a tooth insulator coupling section to which one of the tooth insulators is slidably coupled formed at one side thereof along a radial direction. In some implementations, an internal angle of the tooth insulator coupling section can be an obtuse angle. In some examples, each of the tooth insulator coupling sections of the plurality of coupling protrusions can be convex outward toward a center of the yoke, and an internal angle thereof can be an obtuse angle.

In some examples, an internal angle between the tooth insulator coupling section of the coupling protrusion and an end portion of an inner surface of the yoke insulator (yoke inner surface insulating part) can form an obtuse angle. In some examples, an internal angle between a side portion and an inner surface of the yoke inner surface insulating part can form an obtuse angle. In some examples, an internal angle between an inner surface of the groove and the tooth insulator coupling section of the coupling protrusion can form an obtuse angle.

In some implementations, each of the plurality of tooth insulators can include an assembly guide coupled to both the tooth insulator coupling section and the inner surface of the yoke insulator and configured to guide assembly of the plurality of teeth. Accordingly, when coupling the plurality of teeth to the yoke after the coil parts are respectively wound around the plurality of teeth, the plurality of teeth can be guided by the respective assembly guides, and thus, a direct contact between the insertion end portions of the plurality of teeth and the insertion end accommodating parts of the yoke can be avoided.

In some implementations, since the first coupling tolerance between the assembly guide (tooth insulator) and the yoke insulator is less than the second coupling tolerance between the yoke and the tooth, a direct contact between the yoke and the plurality of teeth can be avoided when the assembly guide (tooth insulator) and the yoke insulator come in slidably contact with each other. This can allow the plurality of teeth and the yoke to be easily coupled to each other.

In some implementations, the assembly guide can extend further to both sides (circumferential direction) than the tooth and is in close contact with the inner surface of the yoke insulator to support the tooth against an external force acting on the tooth in a transverse direction, which can reduce a transverse displacement of the tooth. In some examples, the assembly guide can be in close contact with the inner surface of the yoke insulator (yoke inner insulating part to be described hereinafter), and an inner surface of the yoke insulating part may not be separated (lifted) from the inner surface of the yoke.

In some implementations, a contact surface of the assembly guide, which is coupled to both the coupling protrusion and the inner surface of the yoke insulator, can have a plurality of linear sections that are arranged to form an obtuse angle therebetween.

In some implementations, each of the plurality of coupling protrusions can further include a tooth coupling section that is slidably coupled to a side surface of one of the plurality of teeth. The tooth coupling section can be disposed on an extended line of one side surface of the tooth insulator coupling section.

With this configuration, a portion of the side surface of the tooth and the tooth coupling section of the coupling protrusion can be in contact with each other in addition to a mutual contact area between each of the insertion end portions of the plurality of teeth and each of the inner surfaces of the insertion end accommodating parts, and a transverse displacement of the teeth can be further reduced when an external force in the transverse direction is applied to the teeth.

In some implementations, the yoke insulator can include two yoke end insulating parts that block both ends of the yoke along the axial direction, respectively, and a yoke inner surface insulating part that blocks the inner surface of the yoke. In some examples, the yoke insulator can include a first yoke insulator that includes one of the two yoke end insulating parts and the yoke inner surface insulating part connected to the one of the two yoke end insulating parts, and a second yoke insulator that includes a remaining one of the two yoke end insulating parts and is coupled to the first yoke insulator along the axial direction.

In some examples, an outer surface of the yoke can be exposed to the outside, which may reduce cost of materials used in the insulator. This can also reduce an increase in weight of the stator due to the insulator.

In some implementations, the yoke inner insulating part can be in contact with an outer surface of the coupling protrusion. For example, the outer surface of the coupling protrusion and the inner surface of the yoke can form an obtuse angle.

An internal angle between a side surface of the yoke inner insulating part along a circumferential direction and the inner surface of the yoke insulating part of the yoke can form an obtuse angle.

With this configuration, the outer surface of the assembly guide of the tooth insulator can have a plurality of linear sections arranged at an obtuse angle with respect to each other.

Accordingly, when the yoke and the plurality of teeth are coupled to each other, the yoke inner surface insulating part can be in close contact with the inner surface of the yoke by the assembly guide to thereby prevent separation (lifting) of the yoke inner surface insulating part from the yoke.

In some implementations, the yoke inner surface insulating part can have a protruding end portion that is inserted from one side of the yoke and protrudes to another side of the yoke along the axial direction, and the protruding end portion of the yoke inner surface insulating part can be insertedly coupled to an inside of the second yoke insulator.

In some examples the first yoke insulator and the second yoke insulator can be integrally fixed and coupled to each other.

The first yoke insulator and the second yoke insulator can be adhesively coupled (bonded) together.

In some implementations, the first yoke insulator and the second yoke insulator can be coupled to each other along the axial direction in an engaging manner.

An engaging coupling part can be provided at mutual contact areas of the first yoke insulator and the second yoke insulator so that the first yoke insulator and the second yoke insulator are engagingly coupled to each other in the axial direction.

The engaging coupling part can include a hook protruding from one of the mutual contact areas of the first yoke insulator and the second yoke insulator, and a hook accommodating portion formed in a remaining one of the mutual contact areas of the first yoke insulator and the second yoke insulator so as to allow the hook to be accommodated therein.

A position fixing part can be provided in mutual contact areas of the yoke insulator and the tooth insulator so that the yoke insulator and the plurality of tooth insulators are coupled to a predetermined position.

Accordingly, the first yoke insulator and the second yoke insulator can be accurately assembled to a predetermined position (relative position) along the circumferential direction.

The position fixing part can include a protruding portion protruding from one of mutual contact surfaces of the yoke insulator and the tooth insulator, and an accommodating groove formed in a remaining one of the mutual contact surfaces of the yoke insulator and the tooth insulator and in which the protruding portion is accommodated.

The accommodating groove can be recessed along the axial direction.

The protruding portion can protrude inward along a radial direction of the second yoke insulator, and the accommodating groove can be formed on an end of the first yoke insulator in a recessed manner.

The accommodating groove can have one side that is open along the axial direction.

In some implementations, a position fixing part can be provided at mutual contact areas of the yoke insulator and the tooth insulator so that the yoke insulator and the plurality of tooth insulators are coupled to a predetermined position.

Accordingly, the yoke insulator and the plurality of tooth insulators can be accurately coupled to a predetermined position along the circumferential direction.

The position fixing part can include the engaging coupling part includes a hook protruding from one of the mutual contact areas of the first yoke insulator and the second yoke insulator, and a hook accommodating portion formed in a remaining one of the mutual contact areas of the first yoke insulator and the second yoke insulator so as to allow the hook to be accommodated therein.

In some implementations, the plurality of tooth insulators can each include a first tooth insulator and a second tooth insulator that are coupled to each other along the axial direction with the respective plurality of teeth interposed therebetween.

The first tooth insulator and the second tooth insulator can each have a "U" cross-sectional shape with one side open.

When the first tooth insulator and the second tooth insulator are vertically coupled face-to-face with the tooth interposed therebetween, an upper surface and portions or parts of both side surfaces (upper portions) of the tooth can be insulated by the first insulator, and a lower surface and the rest of the both side surfaces of the tooth can be insulated by the second insulator.

This can enable all of the circumferential surfaces (four surfaces, namely, an upper surface, both side (or lateral) surfaces, and a bottom surface) of the tooth to be insulated.

In some implementations, the plurality of tooth insulators can each include a power wire connection part so that a power wire that supplies power is connected to the plurality of coil parts.

Since the plurality of coil parts (U-phase coil part, V-phase coil part, and W-phase coil part) are intensively wound around the respective teeth, each of the plurality of coil parts can have two ends.

One end of each of the plurality of coil parts can be referred to as a power wire (or power line), and another end of each of the plurality of coil parts can be referred to as a neutral wire (or neutral line, or neutral conductor) electrically connected to different coil parts.

One ends (power wires) of plurality of coil parts can be respectively connected to the power wire connection parts, each having a PCB connection terminal configured as an electric conductor that extends along the axial direction and electrically connected to a PCB.

In some implementations, the yoke insulator can be provided with a neutral wire connection part that connects ends of the plurality of coil parts together. In some examples, one end (neutral wire) of each of the plurality of coil parts can be connected to the neutral wire connection part. The neutral wire connection part is provided with a neutral wire connection conductor made of an electric conductor to simultaneously connect the neutral wires of the plurality of coil parts.

In some examples, a third coupling tolerance can be formed between the yoke and the yoke insulator, and between the plurality of teeth and the tooth insulators, and the third coupling tolerance can be greater than the first coupling tolerance and less than the second coupling tolerance.

In some implementations, the electric motor assembly can further include an impeller and a housing in which the impeller and the stator are accommodated.

When the impeller rotates, air outside the housing can be introduced into the housing and flow therein. In some implementations, the impeller can be disposed at a downstream side of the stator along a flow direction of air. That is, since the stator is disposed at an upstream side of the impeller, air outside the housing, which has a relatively low temperature, can pass through the stator first to thereby facilitate cooling of the stator. This can allow the stator to maintain a relatively low temperature. As the stator and the rotor maintain a relatively low temperature, electric resistance can be low to thereby improve the operation efficiency.

In some implementations, the electric motor assembly can further include a bracket that accommodates a bearing and is coupled to an upstream side of the housing along a flow direction of air so as to support the rotating shaft of the rotor.

In some implementations, the electric motor assembly can further include a printed circuit board (PCB) that is provided at an upstream side of the housing along a flow direction of air and is electrically connected to the stator. The PCB can be effectively cooled by air of a relatively low temperature outside the housing.

In some implementations, as a stator core includes a yoke having a ring shape and a plurality of teeth radially coupled to an inner surface of the yoke, an insulator includes a yoke insulator and tooth insulators, and the teeth are coupled to the yoke after a stator coil is wound around the tooth insulators, an external size (outer diameter) of the stator core can be reduced and facilitate winding of the stator coil.

In some examples, a first coupling tolerance can be defined between the yoke insulator and each tooth insulator, and a second coupling tolerance can be defined between the yoke and each tooth. As the first coupling tolerance can be less (smaller) than the second coupling tolerance, the tooth may be guided to be assembled in a correct position with respect to the yoke when the tooth insulator is coupled to the yoke insulator.

In some implementations, the generation of noise due to movement of air during operation can be suppressed or reduced, and a decrease in air volume caused by an increase in flow resistance can be suppressed or reduced. As a result, the size (outer diameter (rotation diameter)) of the impeller may be reduced to thereby achieve a compact electric motor assembly.

In some examples, each of the plurality of teeth can include an insertion end portion located at an end thereof and inclined inward relative to a lateral side surface thereof. The yoke can include insertion end accommodating parts in which the insertion end portions of the plurality of teeth are respectively inserted in an axial direction, and the concentricity of the ends of the teeth can be stably maintained. Accordingly, a gap between the teeth of the stator and the rotor can be stably maintained, and electromagnetic force imbalance can be suppressed or reduced.

In some implementations, a plurality of coupling protrusions can protrude from the inner surface of the yoke in a radial direction and be disposed at both sides of each of the plurality of teeth, and an external size (outer diameter) of the yoke may be reduced.

In some examples, the coupling protrusion can include a yoke insulator coupling section to which the yoke insulator is coupled and a tooth insulator coupling section to which the tooth insulator is coupled, allowing a coupling force between the teeth and the yoke to be improved.

In some examples, the tooth insulator can include an assembly guide that is coupled to both the tooth insulator coupling section and an inner surface of the yoke insulator and that is configured to guide assembly of the plurality of teeth, and the teeth and the yoke can be easily coupled to each other.

In some examples, the yoke insulator can include a first yoke insulator having a yoke end insulating part and a yoke inner surface insulating part, and a second yoke insulator provided with a yoke end insulating part and coupled to the first yoke insulator along the axial direction. An outer surface of the yoke can be exposed to the outside, and the costs of materials used in the yoke insulator can be reduced accordingly. This can result in reducing weight of the yoke insulator.

In some examples, the tooth insulator can include a first tooth insulator and a second tooth insulator that are coupled to each other along the axial direction with the plurality of teeth interposed therebetween, allowing circumferential surfaces (four surfaces) of each of the plurality of teeth to be insulated.

In some implementations, each of the tooth insulators can be provided with a power wire connecting part to which a power wire configured to supply power to the plurality of coil parts is connected, thereby facilitating power wire wiring. In some examples, the yoke insulator can include a neutral wire connecting part for connecting one ends (neutral wire) of the plurality of coil parts together, thereby facilitating natural wire wiring.

DETAILED DESCRIPTION

Figure 1:
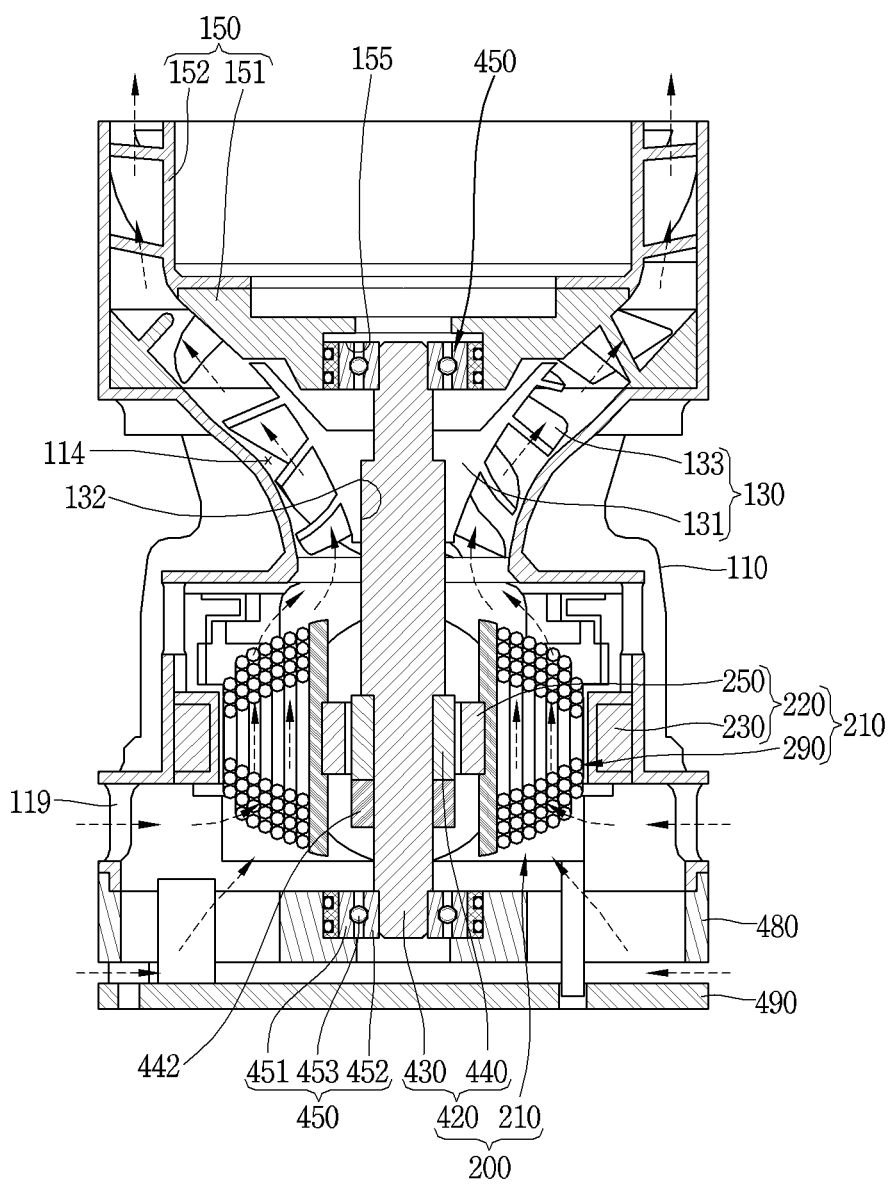
FIG. 1 is a cross-sectional view illustrating an example of an electric motor assembly.

Hereinafter, one or more implementations of the present disclosure will be described in detail with reference to the accompanying drawings. Herein, the same or similar elements are designated with the same or similar reference numerals, and a redundant description has been omitted. Singular expressions include plural expressions unless the context clearly indicates otherwise. In describing the present disclosure, if a detailed explanation for a related known technology or construction is considered to unnecessarily divert the main point, such explanation has been omitted but would be understood by those skilled in the art. Also, it should be understood that the accompanying drawings are merely illustrated to easily explain the concept, and therefore, they should not be construed to limit the technological concept disclosed herein by the accompanying drawings.

Figure 2:
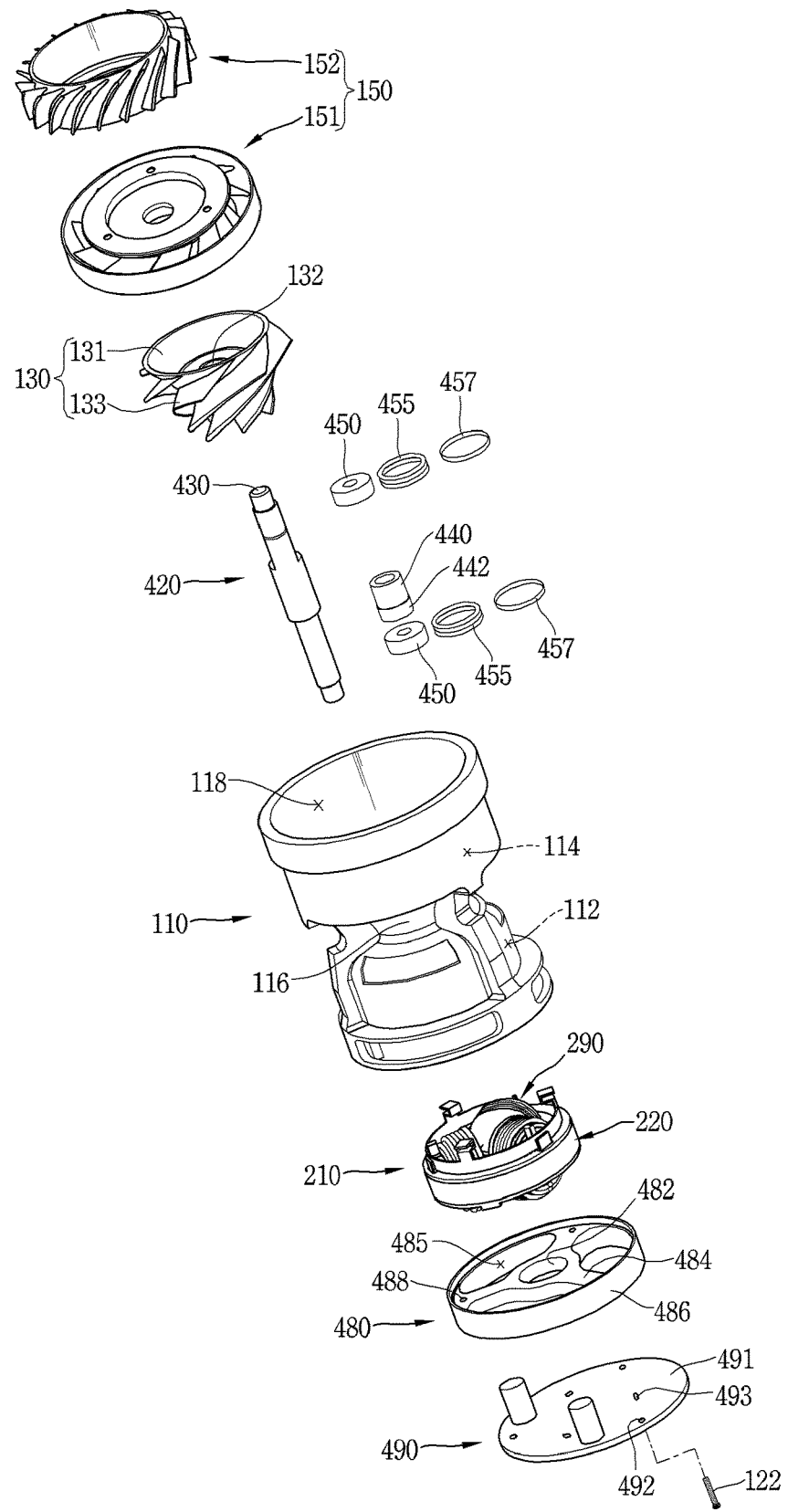
FIG. 2 is an exploded perspective view illustrating the electric motor assembly of FIG. 1.

FIG. 1 is a cross-sectional view of an example illustrating an electric motor assembly, and FIG. 2 is an exploded perspective view illustrating the electric motor assembly of FIG. 1.

In some implementations, as illustrated in FIGS. 1 and 2, an electric motor assembly can include an impeller 130, a stator 210, and a rotor 420.

The impeller 130 can be, for example, configured as a diagonal flow impeller 130 that can suck air in an axial direction and discharge the air to be inclined with respect to the axial direction.

The impeller 130 includes a hub 131 and a plurality of blades 133 disposed in a circumference of the hub 131. A rotating shaft hole 132 in which a rotating shaft (or rotational shaft) 430 is inserted is formed through a center of the hub 131.

An impeller drive (or driving) unit 200 configured to rotate the impeller 130 is provided at one side (lower side in the drawing) of the impeller 130 along the axial direction.

The impeller 130 can suck air from the lower side or part in the drawing and discharge the air to the upper side in the drawing when rotated, for example.

The stator 210 is disposed at an upstream side of the impeller 130 with respect to a flow direction of air moved by the impeller 130.

As air with a relatively low temperature comes into contact with the stator 210 first, cooling of the stator 210 can be facilitated.

The impeller 130 is disposed at a downstream side of the stator 210 along a flow direction of air moved by the impeller 130.

The impeller drive unit 200 includes, for example, a stator 210 and a rotor 420 rotatably disposed with respect to the stator 210.

The impeller drive unit 200 can be configured as a micro motor with a very small external size to be used in a handheld device such as a vacuum cleaner and a hair dryer, for example.

The stator 210 includes, for example, a stator core 220, a stator coil 290 wound around the stator core 220, and an insulator 300 disposed between the stator core 220 and the stator coil 290 for insulating the stator core 220 and the stator coil 290.

In some implementations, the stator 210 can have, for example, a relatively small external size (outer diameter) (e.g., several tens (30-50) of millimeters (mm)).

The rotor 420 includes, for example, a rotating shaft 430 and a permanent magnet 440 rotating about the rotating shaft 430.

In some implementations, an outer diameter of the rotor 420 (e.g., (permanent magnet 440) can have a relatively small diameter, for example, approximately 10 mm (8 to 12 mm).

In some implementations, the stator coil 290 can include three coil parts to be respectively connected to a three-phase AC power supply, and the permanent magnet 440 can have two different magnetic poles (N poles and S poles) alternately arranged along a circumferential direction.

In some implementations, the permanent magnet 440 can have two poles, but this is just one example, and the present disclosure is not limited thereto.

With this configuration, when a rotating magnetic field of the stator coil 290 rotates once, the rotor 420 also rotates once, enabling the rotor 420 to rotate at a high speed.

In the electric motor assembly of this implementation, the rotor 420 can be configured to rotate at 110 krpm to 180 krpm, for example.

This can result in reducing a size (outer diameter (rotation diameter)) of the impeller 130.

In some implementations, the outer diameter of the impeller 130 can be, for example, similar to an outer diameter of the stator core 220 (30 to 50 mm).

In some implementations, the permanent magnet 440 has an axial length (including an overhang) that is slightly greater than an axial length of the stator core 220.

The permanent magnet 440 can protrude to opposite sides of the stator core 220 along the axial direction, as depicted in FIG. 1.

Accordingly, magnetic flux in the permanent magnet 440 can be increased to thereby increase rotational torque of the rotor 420.

In some implementations, the permanent magnet 440 has the axial length slightly greater than the axial length (stacking thickness) of the stator core 220, but this is just an example, and the permanent magnet 440 can have the same axial length as the stator core 220.

An end ring 442 is provided at one side (lower side in the drawing) of the permanent magnet 440.

In some implementations, the end ring 442 is provided at one side of the permanent magnet 440, but this is just an example, and end rings can be provided at both sides of the permanent magnet 440.

A housing 110 is provided outside the impeller 130 and the stator 210.

The housing 110 is provided therein with an accommodation space having a substantially cylindrical shape.

More specifically, the housing 110 has a shape in which its diameter at the center is less than at its ends (both sides).

A stator accommodating portion 112 in which the stator 210 is accommodated is formed in one side (lower side in the drawing) of the housing 110.

The housing 110 is provided with a through-hole 119 to provide communication between the inside and the outside of the housing 110.

Accordingly, air can be introduced into the housing 110 through side (or lateral) surfaces thereof.

An impeller accommodating portion 114 in which the impeller 130 is accommodated is formed in another side (upper side in the drawing) of the housing 110.

One side (upper side in the drawing) of the impeller accommodating portion 114 extends along the axial direction so that a guide vane accommodating portion 118 having a cylindrical shape is formed. A guide vane 150 to be described hereinafter is accommodated in the guide vane accommodating portion 118 and coupled thereto.

The housing 110 is provided at its center with, for example, a communication portion 116 in communication with the stator accommodating portion 112 so as to allow air to be introduced into the impeller accommodating portion 114 from the stator accommodating portion 112.

A diameter of the communication portion 116 is less (or smaller) than diameters of the stator accommodating portion 112 and the impeller accommodating portion 114.

Both sides of the rotating shaft 430 can be rotatably supported by a plurality of bearings 450. The plurality of bearings 450 can each be configured as a ball bearing, for example. The ball bearing, as is well known, includes an outer ring 451, an inner ring 452 disposed concentrically with the outer ring 451, and a plurality of balls 453 disposed between the outer ring 451 and the inner ring 452.

In some implementations, the plurality of bearings 450 can be respectively coupled to both ends of the rotating shaft 430.

A bearing 450 at one side (upper side in FIG. 1) of the plurality of bearings 450 can be disposed inside the impeller 130.

One end (upper end in the drawing) of the rotating shaft 430 passes through the hub 131 of the impeller 130 to be disposed at an inner center of the plurality of blades 133.

A bearing 450 at another side (lower side in FIG. 1) of the plurality of bearings 450 can be disposed at a lower side of the rotor 420 (permanent magnet 440).

Another end (lower end in the drawing) of the rotating shaft 430 passes through the rotor 420 (permanent magnet 440) and is disposed to be spaced apart from the lower side of the rotor 420.

The plurality of bearings 450 can be inserted into bearing holders 455, respectively, for example. The bearing holder 455 has a cylindrical shape. An inner diameter of the bearing holder 455 corresponds to an outer diameter of the bearing 450.

In some implementations, sealing members 457 can be provided at outer surfaces of the bearing holders 455, respectively. The sealing member 457 provided at the outer surface of the bearing holder 455 can be implemented as an O-ring, for example.

A bracket 480 can be provided at an upstream side of the stator 210 with respect to a flow direction of air moved when the impeller 130 rotates.

The bracket 480 can accommodate and support one of the plurality of bearings 450, for example.

The bracket 480 can include, for example, a bearing accommodating portion 482 in which the bearing 450 is accommodated and a plurality of spoke portions 484 radially disposed at an outer surface of the bearing accommodating portion 482.

The bracket 480 can include a rim portion 486 disposed around the plurality of spoke portions 484. This can enable support strength of the plurality of spoke portions 484 and the bearing accommodating portion 482 to be increased.

The plurality of spoke portions 484 are connected to an inner surface of the rim portion 486.

Penetrating portions 485 through which air flows when the impeller 130 rotates are formed between each of the plurality of spoke portions 484.

In some examples, a printed circuit board (PCB) 490 can be connected to the stator coil 290 and disposed at an upstream side of the housing 110 in a flow direction of air moved by the impeller 130.

The PCB 490 includes, for example, a substrate 491 having a disc (or disk) shape. The substrate 491 can include, for example, an electric circuit (e.g., an inverter circuit) to provide three-phase AC power to the stator coil 290. In some examples, a plurality of circuit components or parts constituting the electric circuit can be provided at the substrate 491.

The PCB 490 can be provided at one side (lower side in the drawing) of the bracket 480 along the axial direction. A fixing member insertion hole 492 in which a fixing member 122 that is coupled to the bracket 480 and the housing 110 is inserted is formed through the PCB 490. The PCB 490 is provided with PCB connection terminal insertion portions 493 in which a plurality of PCB connection terminals 377 that are connected to the stator coil 290 are respectively inserted.

The guide vane 150 configured to guide air that has passed through the impeller 130 is disposed at a downstream side (upper side in the drawing) of the impeller 130 along a flow direction of air.

The guide vane 150 can be insertedly coupled to an inside of the housing 110.

The guide vane 150 can include, for example, a first guide vane 151 and a second guide vane 152 that are coupled together along the axial direction.

The impeller 130 can be disposed at one side (lower side in the drawing) of the first guide vane 151 along the axial direction.

The second guide vane 152 can be disposed at another side (upper side in the drawing) of the first guide vane 151 along the axial direction.

The guide vane 150 includes a bearing accommodating portion 155 to accommodate and support the other one of the plurality of bearings 450.

The bearing accommodating portion 155 can be provided at the first guide vane 151, for example.

Figure 3:
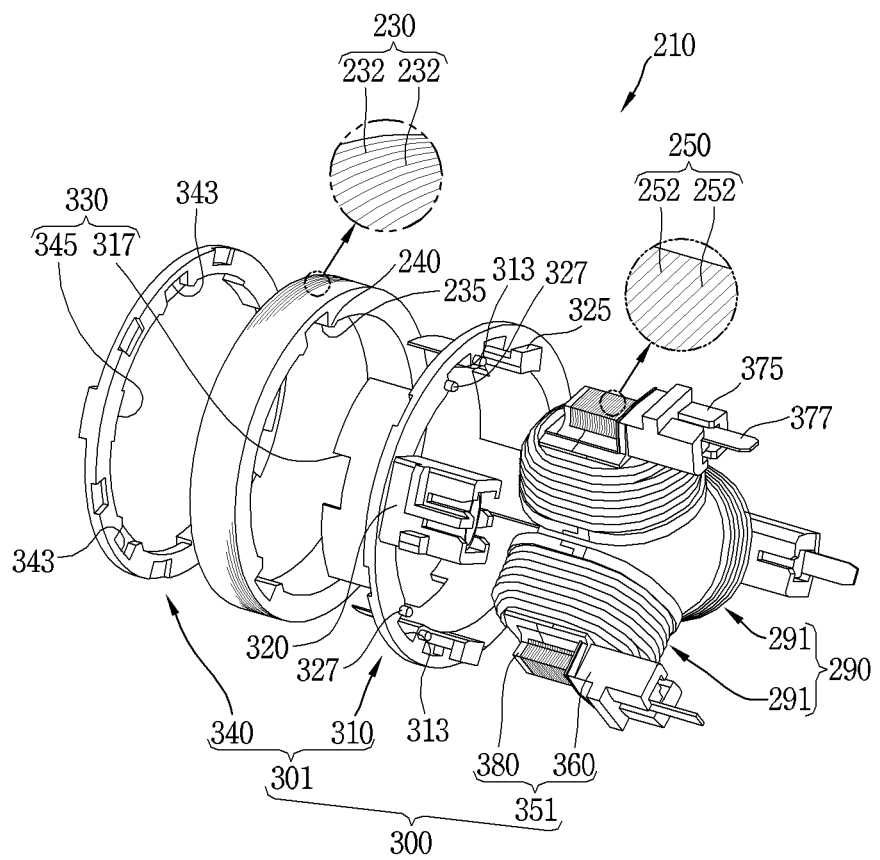
FIG. 3 is a disassembled perspective view illustrating examples of a yoke, a yoke insulator, and a tooth of FIG. 2.
Figure 4:
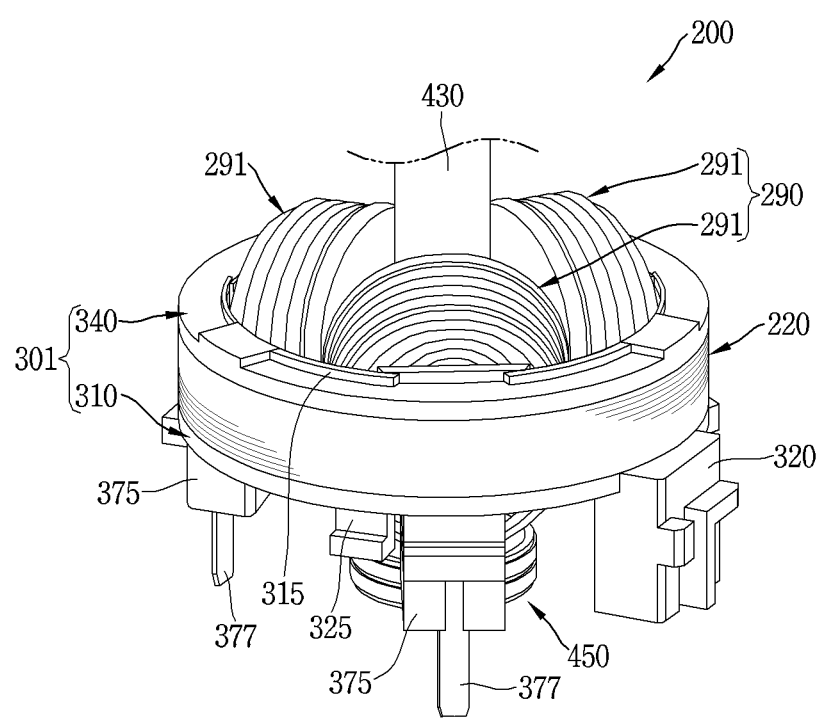
FIG. 4 illustrates an example of a coupled state of the yoke, the yoke insulator, and the tooth of FIG. 3.
Figure 5:
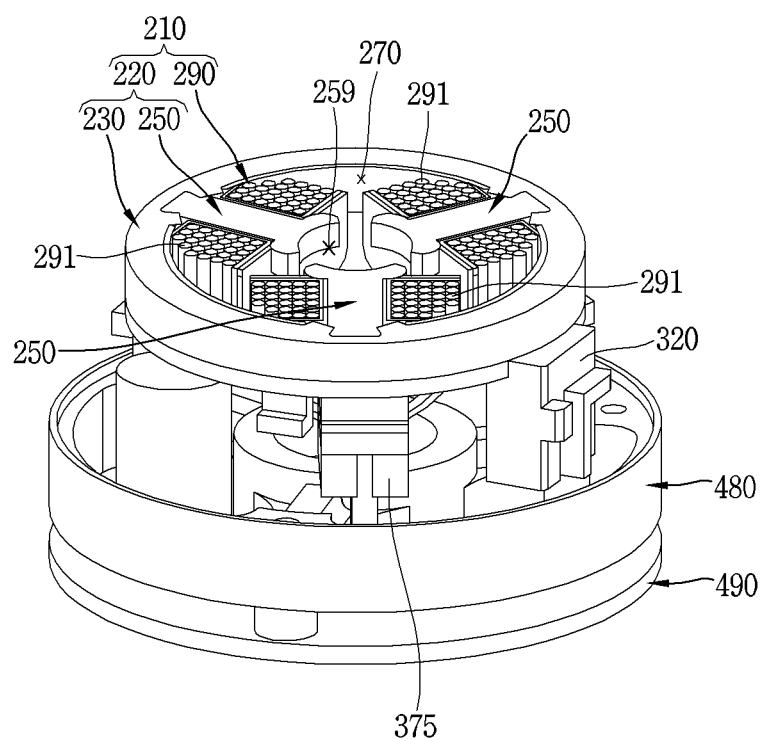
FIG. 5 is a partial perspective view illustrating areas of a yoke and a tooth of a stator of FIG. 1.

FIG. 3 is a disassembled perspective view showing examples of a yoke, a yoke insulator, and a tooth of FIG. 2, FIG. 4 illustrates an example of a coupled state between the yoke, the yoke insulator, and the tooth of FIG. 3, and FIG. 5 is a partial perspective view illustrating example areas of the yoke and the tooth of the stator of FIG. 1.

As illustrated in FIGS. 3 to 5, the stator 210 includes a stator core 220, a stator coil 290 wound around the stator core 220, and an insulator 300 disposed between the stator core 220 and the stator coil 290 for insulating the stator coil 290.

The stator core 220 includes, for example, a yoke 230 having a ring shape and a plurality of teeth 250 radially disposed at an inner surface of the yoke 230 to be spaced apart from each other in the circumferential direction.

In some implementations, the stator core 220 can have a thin cylindrical shape.

The stator core 220 has a short (small) axial length (stacking thickness), relative to its diameter. In some implementations, the stator core 220 can have a stacking thickness of 8 to 15 mm, for example.

The yoke 230 can be formed by stacking a plurality of electrical steel plates 232 having a ring shape in an insulating manner, for example.

The yoke 230 is provided with a plurality of insertion end accommodating parts 235 to which respective ends of the plurality of teeth 250 are coupled.

Each of the plurality of insertion end accommodating parts 235 is recessed outward from the inner surface of the yoke 230 along a radial direction.

The plurality of teeth 250 can be three in number, for example.

The plurality of teeth 250 can be 120 degrees apart from each other along the circumferential direction.

A plurality of slots 270 are formed between each of the plurality of teeth 250.

In some implementations, three teeth 250 and three slots 270 are provided, and the teeth 250 and the slots 270 are alternately disposed along a circumferential direction of the stator core 220.

Each of the plurality of teeth 250 can be formed by stacking a plurality of electric steel plates 252 in an insulating manner, for example.

The plurality of teeth 250 can each have substantially the same axial length (stacking thickness) as the stator core 220.

As the stator core 220 (yoke 230 and the tooth 250) has a thin thickness (axial length or stacking thickness) along the axial direction, an air gap between the plurality of teeth 250 and the yoke 230 can be uniformly maintained when the yoke 230 and the plurality of teeth 250 are coupled to each other.

Accordingly, a magnetic imbalance between the stator 210 and the rotor 420 can be suppressed.

The stator coil 290 includes, for example, a plurality of coil parts 291 wound around the plurality of teeth 250.

The plurality of coil parts 291 are configured to generate an electromagnetic force when current corresponding to each phase (U phase, V phase, and W phase) of a three-phase AC power supply is applied.

The insulator 300 is, as is well known, made of an electrical insulating member.

The insulator 300 includes, for example, a yoke insulator 301 that is coupled to the yoke 230 and tooth insulators 351 that are respectively coupled to the plurality of teeth 250.

The yoke insulator 301 can include, for example, yoke end insulating parts 312 and 342 that respectively block (insulate) both end surfaces of the yoke 230 along the axial direction and a yoke inner surface insulating part 314 that blocks (insulates) the inner surface of the yoke 230.

The yoke insulator 301 can be configured to have, for example, a first yoke insulator 310 that includes the yoke end insulating part 312 and the yoke inner surface insulating part 314 (see FIG. 9), and a second yoke insulator 340 that includes the yoke end insulating part 342 (see FIG. 18) and is coupled to the first yoke insulator 310.

The first yoke insulator 310 is disposed to block one end (lower end in the drawing) of the yoke 230 along the axial direction.

The yoke inner surface insulating part 314 is disposed inside the yoke 230 so as to block the inner surface of the yoke 230.

The yoke inner surface insulating part 314 can axially extend from inner surfaces of the yoke end insulating parts 312 and 342, for example.

An outer diameter of the yoke inner surface insulating part 314 is less than an inner diameter of the yoke 230.

More specifically, the yoke inner surface insulating part 314 is disposed between the teeth 250. The yoke inner surface insulating part 314 is disposed to block the inner surface of the yoke 230 on which the plurality of slots 270 are formed.

The yoke inner surface insulating part 314 can have a sufficient length to protrude from one side (lower side in the drawing) to another side (upper side in the drawing) of the yoke 230 along the axial direction.

In detail, the yoke inner surface insulating part 314 includes a protruding end portion 315 that is inserted from one end of the yoke 230 along the axial direction and protrudes from another end of the yoke 230. The protruding end portion 315 refers to a portion of the entire length of the yoke inner surface insulating part 314 that protrudes longer than the end of the yoke 230 in the axial direction.

The second yoke insulator 340 has a ring shape so as to block an end surface of the yoke 230.

The first yoke insulator 310 and the second yoke insulator 340 can be coupled to each other in the axial direction.

The first yoke insulator 310 can be coupled to one side of the yoke 230 along the axial direction, and the protruding end portion 315 that protrudes to another side of the yoke 230 can be insertedly coupled to an inside of the second yoke insulator 340 along the radial direction.

Each of the tooth insulators 351 can include a first tooth insulator 360 and a second tooth insulator 380 that are coupled to each other along the axial direction.

The first tooth insulator 360 and the second tooth insulator 380 can be coupled to each other with the tooth 250 interposed therebetween.

Each of the plurality of teeth 250 has an insertion end portion (or insertion end) 255 (see FIG. 7) that is coupled to the yoke 230.

The plurality of teeth 250 can each include, for example, a tooth body 253 (see FIG. 7) and an insertion end portion 255 (see FIG. 7) formed at one end of the tooth body 253.

The insertion end portion 255 is configured to be exposed to the outside of the first tooth insulator 360 and the second tooth insulator 380.

The stator coil 290 is wound around each of the tooth insulators 351.

The stator coil 290 includes a plurality of coil parts 291 intensively wound around the plurality of teeth 250.

The plurality of coil parts 291 are wound on outer sides of the tooth bodies 253, respectively.

In some implementations, three coil parts 291 are provided.

The plurality of coil parts 291 are respectively connected to each phase (U-phase, V-phase, and W-phase) of a three-phase AC power supply.

A plurality of power wire connection parts 375 to which one ends (power wires 293) of the plurality of coil parts 291 are connected can be formed at the respective tooth insulators 351.

Three power wire connection parts 375 can be provided.

Each of the plurality of power wire connection parts 375 includes a cut-out portion 376 (see FIG. 19) that is cut in the axial direction. The power wire 293 (see FIG. 19) is inserted into the cut-out portion 376.

The plurality of power wire connection parts 375 can each include a PCB connection terminal 377 that is electrically connected to the PCB 490.

Each of the PCB connection terminals 377 is made of an electric conductor. Each of the PCB connection terminals 377 has a body 377a (see FIG. 19) that is inserted into the power wire connection part 375. A connecting pin 377b (see FIG. 19) that is connected to the PCB 490 is provided at one side of the body 377a in a manner of extending along the axial direction. A slit 377c (see FIG. 19) that is cut to allow the power wire 293 is inserted therein is formed at another side of the body 377a of the PCB connection terminal 377.

The yoke insulator 301 can be provided with neutral wire connection parts 320 to which other ends (neutral wires 294) of the plurality of coil parts 291 are respectively connected.

The neutral wire connection part 320 can axially protrude from the yoke end insulating part 312 of the first yoke insulator 310.

The first yoke insulator 310 is provided with position fixing protrusions 327 to be described hereinafter that are coupled to the tooth insulators 351.

A connection hook 325 that supports an end portion (neutral wire 294) of the stator coil 290 can be provided at the first yoke insulator 310.

An engaging part 330 is provided at the first yoke insulator 310 and the second yoke insulator 340 so that the first yoke insulator 310 and the second yoke insulator 340 are coupled to each other at a preset or predetermined position.

The engaging part 330 of the yoke insulator 301 can include a protruding portion 345 formed in mutual contact areas of the first yoke insulator 310 and the second yoke insulator 340, and an accommodation groove 317 in which the protruding portion 345 is accommodated.

The protruding portion 345 can be formed on the second yoke insulator 340, for example.

The protruding portion 345 can protrude inward of the second yoke insulator 340.

The accommodation groove 317 can be provided on the yoke inner surface insulating part 314 of the first yoke insulator 310, for example.

The accommodation groove 317 can be formed on the protruding end portion 315 of the yoke inner surface insulating part 314 to be cut open along the axial direction, for example.

Figure 6:
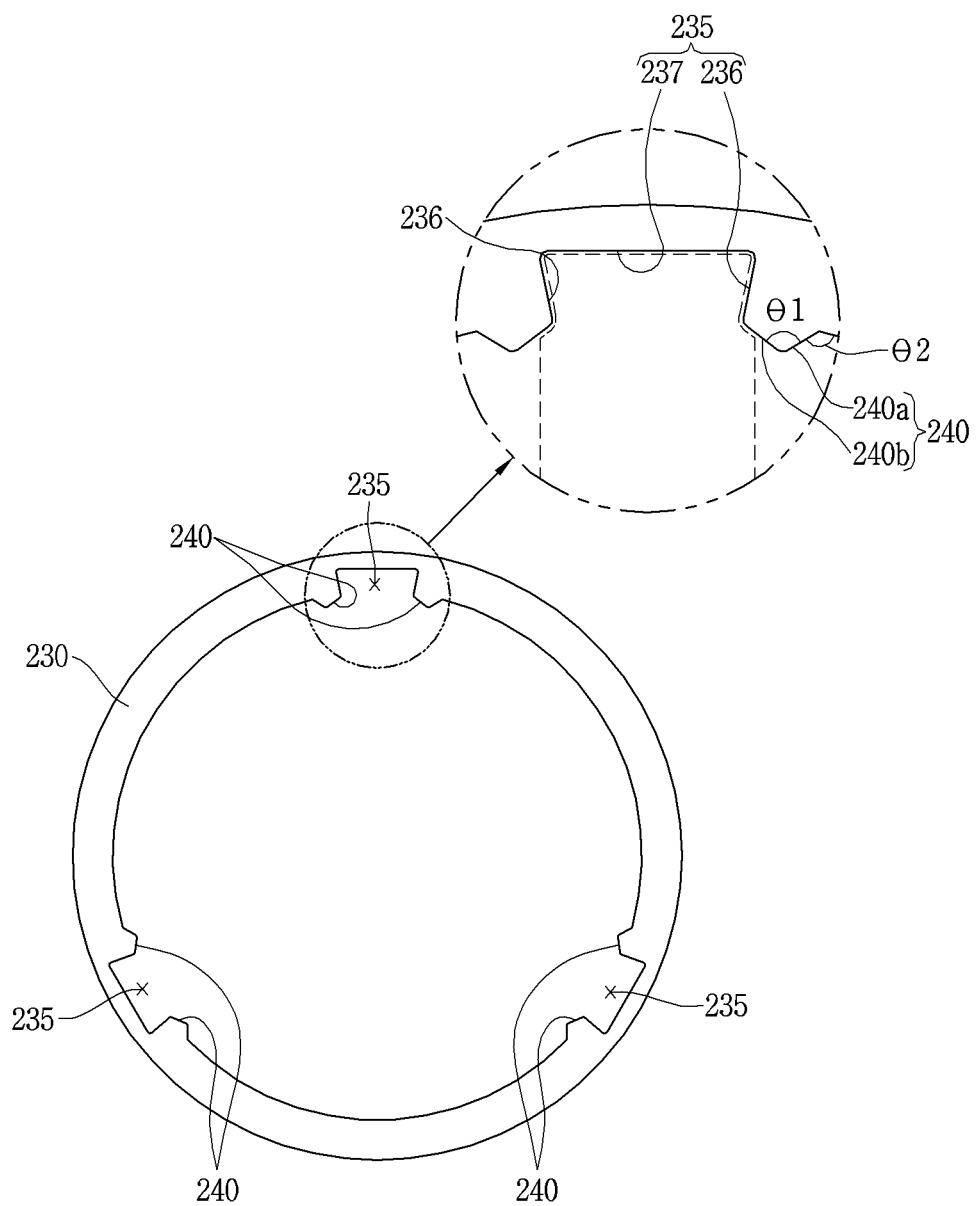
FIG. 6 is a planar view illustrating the yoke of FIG. 5.
Figure 7:
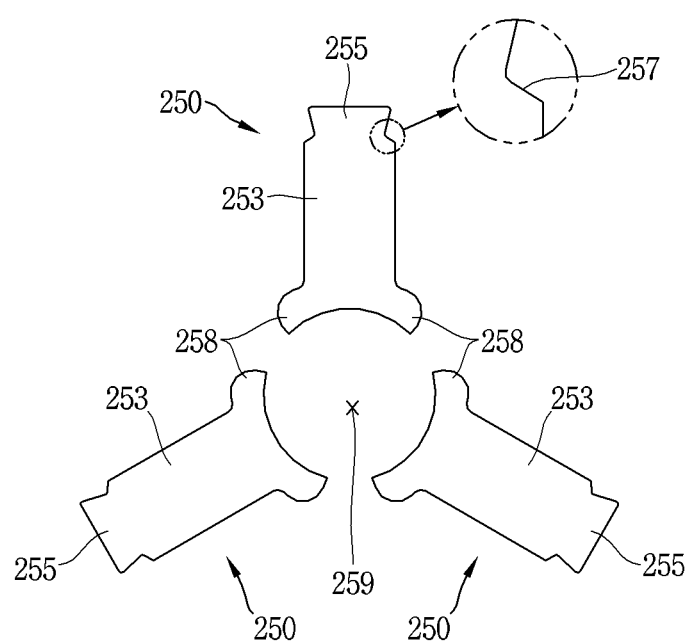
FIG. 7 is a planar view illustrating the tooth of FIG. 5.

FIG. 6 is a planar view illustrating the yoke of FIG. 5, and FIG. 7 is a planar view illustrating the tooth of FIG. 5. As illustrated in FIG. 6, the yoke 230 can include a plurality of insertion end accommodating parts 235. The plurality of insertion end accommodating parts 235 are spaced apart from one another along the circumferential direction. The plurality of insertion end accommodating parts 235 are recessed outward from the inner surface of the yoke 230 along a radial direction of the yoke 230.

The plurality of insertion end accommodating parts 235 can each have a dovetail groove shape, for example. Each of the plurality of insertion end accommodating parts 235 has side portions 236 that are inclined inward.

Each of the plurality of insertion end accommodating parts 235 includes a recessed base portion 237 that linearly connects the both side portions 236. In some examples, the recessed base portion 237 can linearly connect the both side portions 236. In some implementations, the recessed base portion 237 has a linear shape. But this is just an example, and the recessed base portion 237 can have an arcuate shape.

A plurality of coupling protrusions 240 can protrude from the inner surface of the yoke 230 along the radial direction so as to be disposed at both sides of each of the plurality of teeth 250.

When an external force is applied to the plurality of teeth 250 in a transverse direction (circumferential direction), the plurality of teeth 250 are supported by the coupling protrusions 240, respectively. As a result, transverse displacement of the teeth 250 can be suppressed.

With this configuration, a radial thickness of the yoke 230 can be reduced.

Accordingly, the outer diameter of the stator core 220 (yoke 230) can be reduced.

The plurality of coupling protrusions 240 are formed at both sides of the insertion end accommodating part 235, respectively.

One sides of the plurality of coupling protrusions 240 define the side portions 236 of the insertion end accommodating part 235, respectively.

Each of the plurality of coupling protrusions 240 is provided with a tooth insulator coupling section 240a formed at one side thereof along the radial direction and to which one of plurality of tooth insulators 351 is slidably coupled along the axial direction.

The tooth insulator coupling section 240a of the coupling protrusion 240 has a shape that protrudes toward a center of the yoke 230.

An internal angle θ1 of the tooth insulator coupling section 240a is an obtuse angle.

An internal angle θ2 between the coupling protrusion 240 and the inner surface of the yoke 230 forms an obtuse angle.

The plurality of coupling protrusions 240 each includes a tooth coupling section 240b that is slidably coupled to a side surface of one of the plurality of teeth 250.

The tooth coupling section 240b is disposed on the same line as one line segment (inner section) of the tooth insulator coupling section 240a.

As illustrated in FIG. 7, shoes 258 that extend to both sides of the tooth body 253 along the circumferential direction are provided at an inner end of each of the plurality of teeth 250.

The inner ends of the plurality of teeth 250 define a rotor accommodating hole 259 in which the rotor 420 is rotatably accommodated with a predetermined air gap.

The insertion end portions 255 that are inserted into the respective insertion end accommodating parts 235 of the yoke 230 are formed at outer ends of the plurality of teeth 250, respectively.

The insertion end portions 255 can each have, for example, a dovetail shape.

The insertion end portions 255 can each have, for example, side portions that are inclined inward.

Accordingly, when the plurality of teeth 250 are coupled to the respective insertion end accommodating parts 235 of the yoke 230, the side portions inclined with respect to the radial direction are brought into surface contact with the side portions 236 of the insertion end accommodating part 235. This can result in suppressing radial movement of the plurality of teeth 250.

Thus, the concentricity of the inner ends of the plurality of teeth 250 can be stably maintained.

Each of the plurality of teeth 250 is provided with a coupling protrusion contact portion 257 in contact with one of the plurality of coupling protrusions 240.

Each of the coupling protrusion contact portions 257 can be inclined outward.

Once the plurality of teeth 250 and the yoke 230 are coupled to each other, the coupling protrusion contact portions 257 can allow transverse displacement of the plurality of teeth 250 to be further suppressed or reduced when an external force is applied to the plurality of teeth 250 in the transverse direction.

Figure 8:
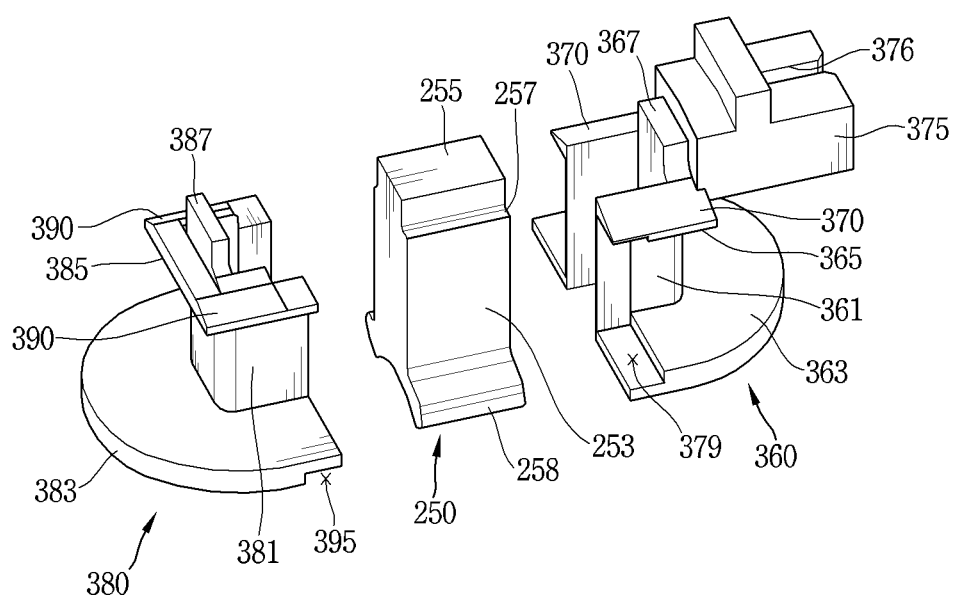
FIG. 8 is a disassembled perspective view illustrating the tooth and a tooth insulator of FIG. 3.

FIG. 8 is a disassembled perspective view illustrating the tooth and the tooth insulator of FIG. 3. As illustrated in FIG. 8, the tooth insulator 351 includes a first tooth insulator 360 and a second tooth insulator 380 that are coupled face-to-face with the tooth 250 interposed therebetween.

The first tooth insulator 360 and the second tooth insulator 380 can be coupled to each other along a stacking direction of the tooth 250, for example.

The first tooth insulator 360 includes a tooth insulating portion 361 that blocks an end surface and portions or parts of both side surfaces of the tooth 250.

The tooth insulating portion 361 of the first tooth insulator 360 has a "U" cross-sectional shape so as to block one end surface (lower end surface in the drawing) and portions of the both side surfaces of the tooth 250 along the axial direction.

The tooth insulating portion 361 of the first tooth insulator 360 has a length (radial length) that allows the shoes 258 and the insertion end portion 255 of the tooth 250 to be exposed to the outside.

The first tooth insulator 360 includes an inner guide 363 disposed at one side of the shoes 258 of the tooth 250 to guide a coil wound around the tooth 250.

The inner guide 363 of the first tooth insulator 360 extends outward from an outer surface of the tooth 250.

The first tooth insulator 360 is provided with an outer guide 365 disposed at one side of the insertion end portion 255 of the tooth 250 to guide a coil.

An assembly guide 370 is provided on at outer surface of the outer guide 365.

The first tooth insulator 360 is provided with an insertion end insulating portion 367 that blocks one end of the insertion end portion 255 of the tooth 250.

The first tooth insulator 360 is provided with the power wire connection part 375 to which one end (power wire 293) of the coil part 291 wound around the tooth insulating portion 361 is connected.

The power wire connection part 375 includes an accommodation space therein.

A cut-out portion 376 is formed at one side of the power wire connection part 375 to allow one end (power wire 293) of the coil part 291 to be inserted therein.

The PCB connection terminal 377 is accommodated in the power wire connection part 375 and is coupled thereto.

The second tooth insulator 380 includes a tooth insulating portion 381 that blocks one end (upper end in the drawing) and portions of the both side surfaces of the tooth 250 along the axial direction.

The tooth insulating portion 381 of the second tooth insulator 380 has a length that allows the shoes 258 and the insertion end portion 255 of the tooth 250 to be exposed to the outside.

The second tooth insulator 380 includes an inner guide 383 that guides the coil part 291 wound around the tooth insulating portion 381.

The inner guide 383 of the second tooth insulator 380 extends outward from a circumferential surface of the tooth insulating portion 381.

The second tooth insulator 380 is provided with an outer guide 385 that guides the coil part 291 wound around the tooth insulating portion 381. The outer guide 385 is provided at its outer surface with an assembly guide 390 that is in sliding contact with the coupling protrusion 240, and a side surface portion 3142 (see FIG. 11) and an inner surface 3141 (see FIG. 11) of the yoke inner surface insulating part 314. The assembly guide 390 of the second tooth insulator 380 is configured to have the same structure as the assembly guide 370 of the first tooth insulator 360. The assembly guide 390 can have first to fourth sections that extend from first to fourth sections 371, 372, 373, and 374 of the assembly guide 370 of the first tooth insulator 360 along the axial direction.

The second tooth insulator 380 includes an insertion end insulating portion 387 that is disposed along the axial direction to block the insertion end portion 255 of the tooth 250.

The first tooth insulator 360 and the second tooth insulator 380 can partially overlap with each other.

Accordingly, a creepage distance between the stator coil 290 and the tooth 250 can be increased.

More specifically, when the first tooth insulator 360 and the second tooth insulator 380 are coupled to each other along the axial direction, the tooth insulating portion 361, the inner guide 363, and the outer guide 365 can overlap the tooth insulating portion 381, the inner guide 383, and the outer guide 385, respectively.

To this end, the first tooth insulator 360 and the second tooth insulator 380 can each have one region (or portion) cut in a predetermined length along a thickness direction.

In some implementations, the first tooth insulator 360 includes a first cut-out portion 379 that is cut such that outer surfaces of the tooth insulating portion 361, the inner guide 363, and the outer guide 365 are reduced in thickness.

Corresponding to this, the second tooth insulator 380 has a second cut-out portion 395 that is cut such that inner surfaces of the tooth insulating portion 381, the inner guide 383, and the outer guide 385 are reduced in thickness.

When the first tooth insulator 360 and the second tooth insulator 380 are coupled to each other, the first cut-out portion 379 is coupled to an inside of the second cut-out portion 395.

In some implementations, the first cut-out portion 379 formed by cutting an outer surface of the first tooth insulator 360 in the thickness direction, and the second cut-out portion 395 formed by cutting an inner surface of the second tooth insulator 380 in the thickness direction are provided, but this is just an example, and the vice versa is also possible.

Figure 9:
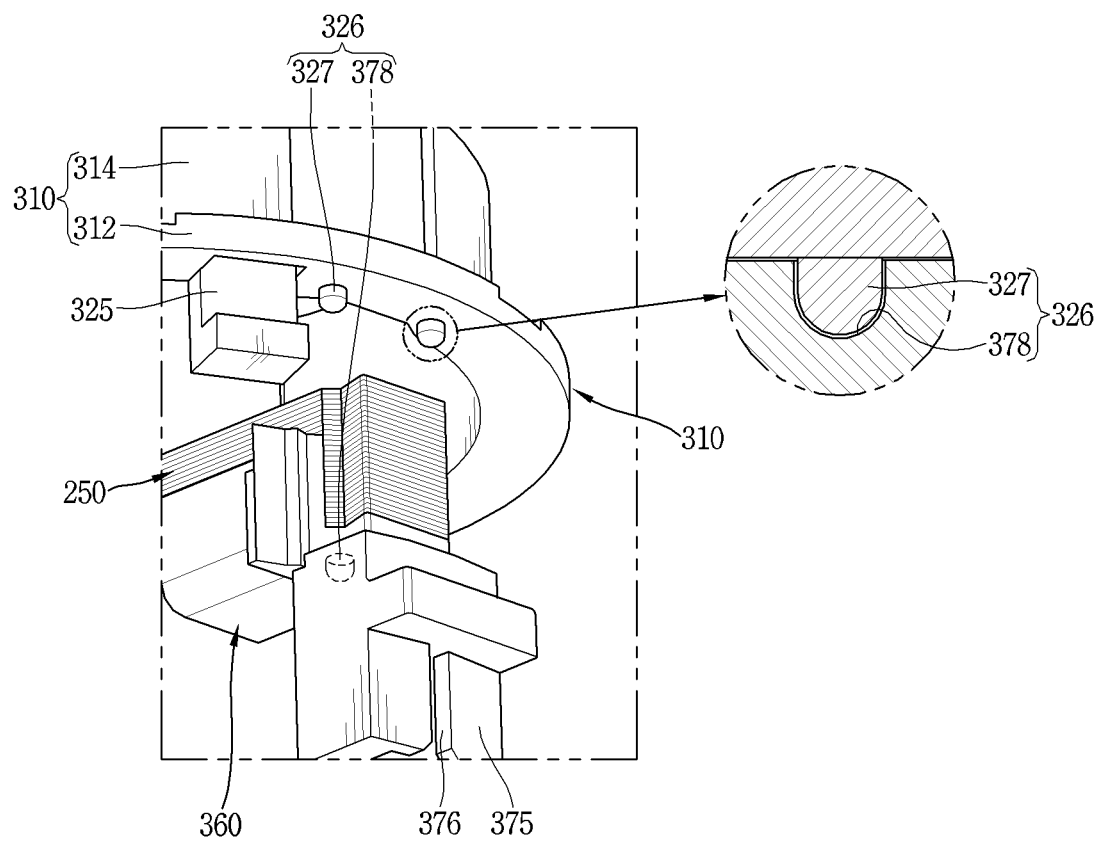
FIG. 9 is a partially enlarged view illustrating an example state before the yoke insulator and the tooth insulator of FIG. 3 are coupled to each other.
Figure 10:
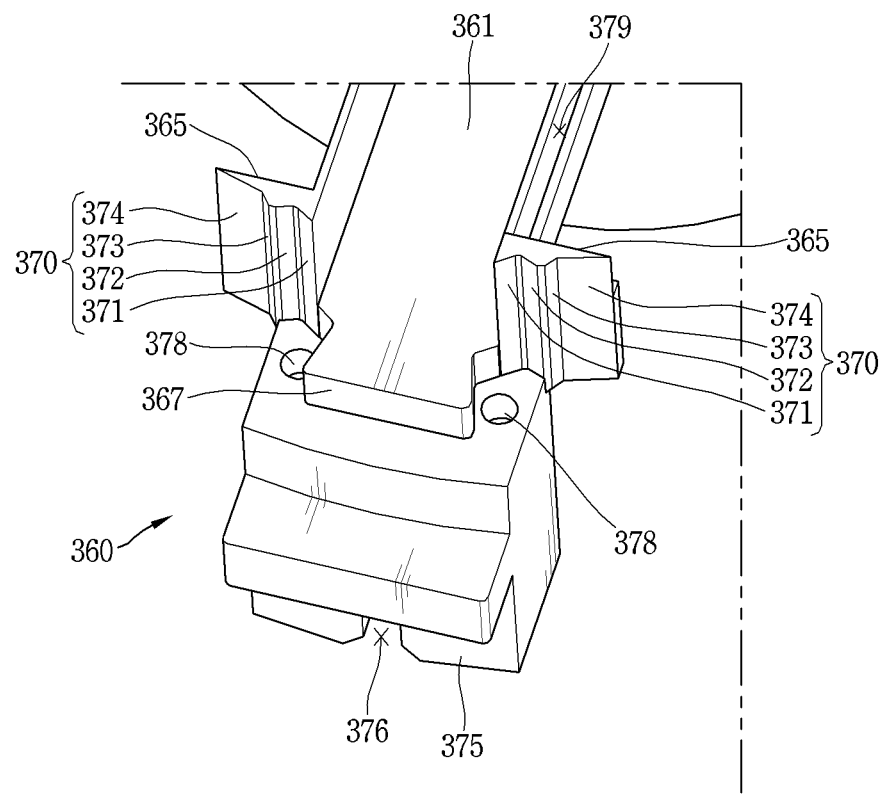
FIG. 10 is a partially enlarged perspective view illustrating the tooth insulator of FIG. 9.

FIG. 9 is a partially enlarged view illustrating an example state before the yoke insulator and the tooth insulator of FIG. 3 are coupled to each other, and FIG. 10 is a partially enlarged perspective view illustrating the tooth insulator of FIG. 9. Referring back to FIGS. 3 and 4, the yoke insulator 301 is coupled to the yoke 230 in a manner of blocking upper and lower ends of the yoke 230 along the axial direction, and the tooth insulator 351 is configured such that the insertion end portion 255 of the tooth 250 is inserted into the insertion end accommodating part 235 of the yoke 230 along the axial direction. In some examples a portion or part of the tooth insulator 351 and the yoke insulator 301 are in contact with each other.

A position fixing part 326 is provided in a mutual contact area between the yoke insulator 301 and the tooth insulator 351 such that the yoke insulator 301 and the tooth insulator 351 are coupled to each other at a preset or predetermined position.

More specifically, the position fixing part 326 can include, for example, a position fixing protrusion 327 that protrudes from one of mutual contact surfaces of the yoke insulator 301 and the tooth insulator 351, and a position fixing protrusion accommodating portion 378 provided at a remaining one of the mutual contact surfaces of the yoke insulator 301 and the tooth insulator 351.

As illustrated in FIG. 9, the position fixing protrusion 327 can be formed on the yoke insulator 301. The position fixing protrusion 327 can be provided at both sides of the insertion end accommodating part 235 along the axial direction. The position fixing protrusion 327 can be configured as two in number, for example.

In some implementations, the position fixing protrusions 327 can be formed on a bottom surface of the first yoke insulator 310 disposed at a lower side of the yoke 230.

The position fixing protrusions 327 can each have an end with a hemispherical shape (arcuate cross section) along its protruding direction.

This can facilitate insertion of the position fixing protrusion 327 and the position fixing protrusion accommodating portion 378.

A connection hook 325 is formed at one side of the position fixing protrusion 327 along a circumferential direction of the yoke insulator 301.

As illustrated in FIG. 10, the position fixing protrusion accommodating portion 378 is formed at the tooth insulator 351.

The position fixing protrusion accommodating portion 378 is provided at the first tooth insulator 360 to be recessed along the axial direction.

The position fixing protrusion accommodating portion 378 can be provided at both sides of the insertion end insulating portion 367 of the first tooth insulator 360. In some examples, the position fixing protrusion accommodating portions 378 can be recessed from an upper surface of the power wire connection part 375 of the first tooth insulator 360.

With this configuration, when the first yoke insulator 310 is coupled to the lower side of the yoke 230, and the tooth 250 is inserted into the yoke 230 along the axial direction, the position fixing protrusions 327 can be inserted into the position fixing protrusion accommodating portions 378.

The assembly guide 370 that is insertedly coupled to an inside of the yoke 230 is provided at one side of the position fixing protrusion accommodating portion 378.

Figure 11:
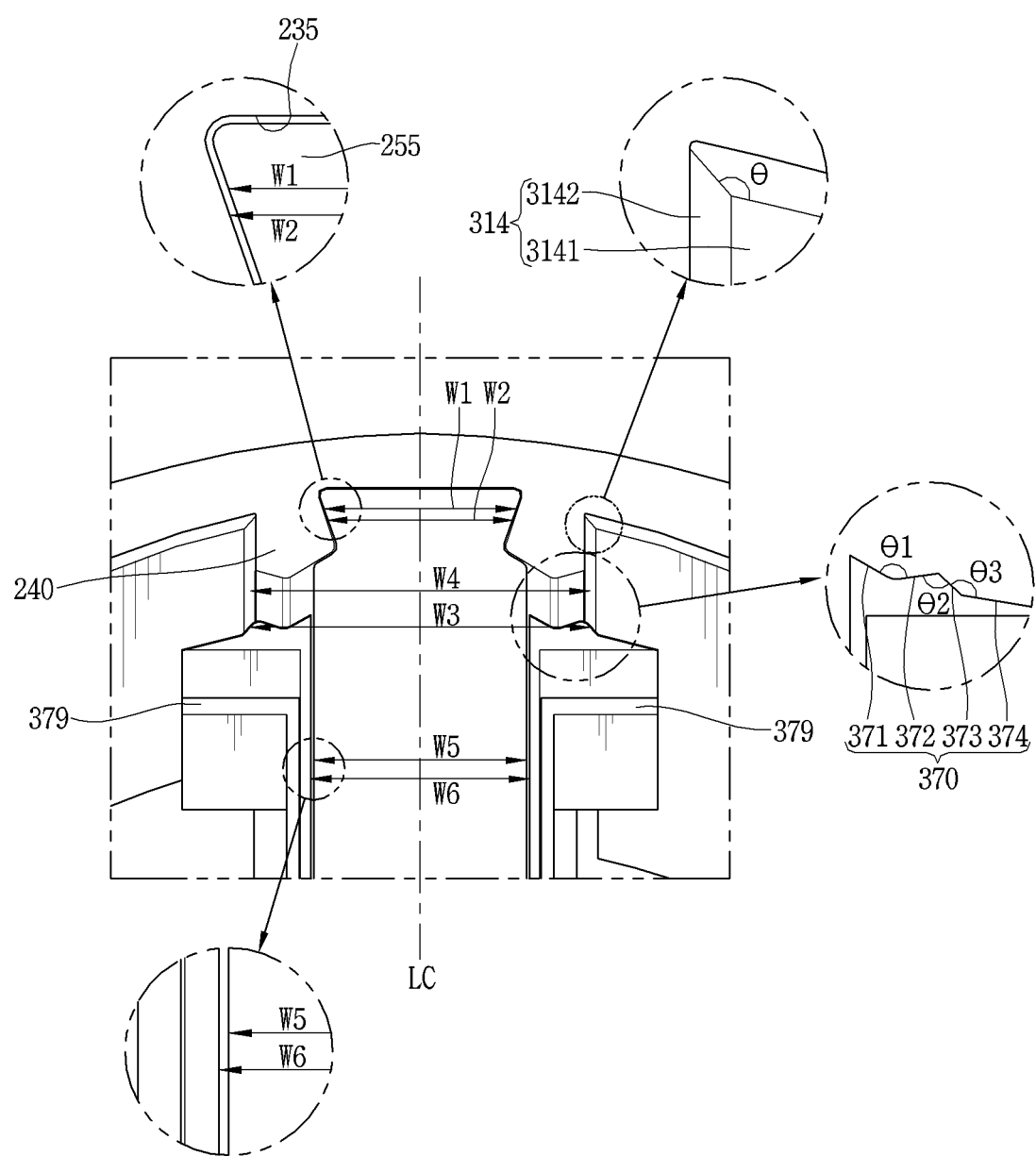
FIG. 11 is a partially enlarged perspective view illustrating an example of a coupled region between the yoke and the tooth of FIG. 5.
Figure 12:
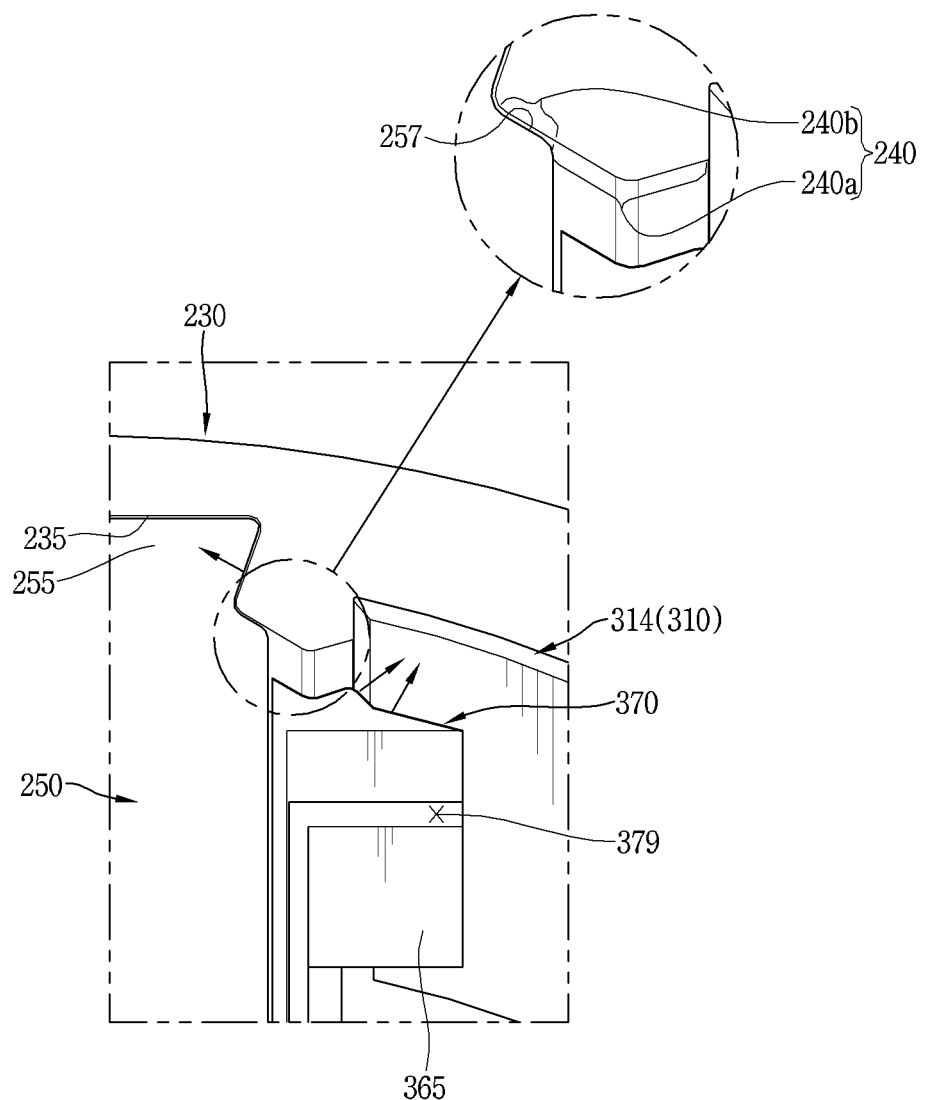
FIG. 12 is a view for explaining an example of coupling of a coupling protrusion, an assembly guide, and a yoke inner surface insulating part of FIG. 11.

FIG. 11 is a partially enlarged perspective view illustrating an example of a coupled region between the yoke and the tooth of FIG. 5, and FIG. 12 is a view illustrating how the coupling protrusion, the assembly guide, and the yoke inner surface insulating part of FIG. 11 work. As illustrated in FIGS. 11 and 12, an end surface of the yoke 230 and an end surface of the tooth 250 define the same plane along the axial direction.

In some implementations, a stacking thickness of the yoke 230 and a stacking thickness of the tooth 250 can be the same.

The first yoke insulator 310 can be coupled from one side (lower side in the drawing) of the yoke 230 along the axial direction.

The yoke inner surface insulating parts 314 of the first yoke insulator 310 are inserted into the yoke 230 to be in contact with outer surfaces of the coupling protrusions 240, respectively.

The protruding end portion 315 of the first yoke insulator 310 protrudes upward from an end surface (upper end surface) of the yoke 230 along the axial direction.

The tooth 250 can be coupled from one side (lower side in the drawing) of the yoke 230 along the axial direction.

In FIGS. 11 and 12, for the sake of convenience, the second yoke insulator 340 and the second tooth insulator 380 are removed.

When the insertion end portion 255 of the tooth 250 is inserted into a groove of the yoke 230, both side surfaces of the insertion end portion 255 are respectively brought into contact with the side portions 236 of the insertion end accommodating part 235, and the coupling protrusion contact portion 257 of the tooth 250 is in contact with the tooth coupling section 240*b* of the coupling protrusion 240.

The assembly guide 370 of the first tooth insulator 360 is in contact with the coupling protrusion 240 and the yoke inner surface insulating part 314.

In detail, referring further to FIGS. 10 and 11, the assembly guide 370 of the first tooth insulator 360 includes a first section 371 in contact with the tooth insulator coupling section 240*a* of the coupling protrusion 240, a second section 372, a third section 373 in contact with the side surface portion 3142 of the yoke inner surface insulating part 314 of the first yoke insulator 310 and a fourth section 374 in contact with the inner surface 3141 of the yoke inner surface insulating part 314.

In some examples the first section 371, the second section 372, the third section 373, and the fourth section 374 of the assembly guide 370 are configured as linear (or straight) sections, and an internal angle of adjacent sections forms an obtuse angle.

That is, an internal angle θ1 between the first section 371 and the second section 372 of the assembly guide 370 forms an obtuse angle, and an internal angle θ2 between the second section 372 and the third section 373 forms an obtuse angle. An internal angle θ3 between the third section 373 and the fourth section 374 also forms an obtuse angle.

In some examples an internal angle θ between the inner surface 3141 of the yoke inner surface insulating part 314 of the first yoke insulator 310 and the side surface portion 3142 of the yoke inner surface insulating part 314 can form an obtuse angle.

In the electric motor assembly, a first coupling tolerance, which is a coupling tolerance between the yoke insulator 301 and the tooth insulator 351, is less than a second coupling tolerance, which is a coupling tolerance between the yoke 230 and the tooth 250. For example, the coupling tolerances can be defined as a distance or a gap between the coupled parts, or as room for variation of such distance or gap.

Accordingly, when coupling the yoke 230 and the teeth 250 together in a state that the yoke insulator 301 is coupled to the yoke 230, and the tooth insulators 351 are coupled to the teeth 250, the teeth 250 are guided in the axial direction along an axial center line by a relative movement between the yoke insulator 301 and the tooth insulators 351, facilitating the coupling between the teeth 250 and the yoke 230.

That is, as the coupling tolerance between the yoke insulator 301 and the tooth insulator 351 is relatively small, a direct contact between the yoke 230 and the teeth 250 is suppressed when inserting the insertion end portions 255 of the teeth 250 into the insertion end accommodating parts 235 of the yoke 230, allowing the yoke 230 and the teeth 250 to be smoothly coupled to each other.

The tooth 250 and the tooth insulator 351 can be coupled to each other with a third coupling tolerance, for example.

More specifically, the tooth 250 and the first tooth insulator 360, and the tooth 250 and the second tooth insulator 380 are respectively coupled to each other with the third coupling tolerance.

The yoke 230 and the yoke insulator 301 can be coupled to each other with a third coupling tolerance, for example.

In detail, the yoke 230 and the first yoke insulator 310, and the yoke 230 and the second yoke insulator 340 are respectively coupled to each other with the third coupling tolerance.

In some examples the third coupling tolerance can be greater than the first coupling tolerance and less than the second coupling tolerance.

In detail, the first coupling tolerance can be 0.02, the second coupling tolerance can be 0.1, and the third coupling tolerance can be 0.05, for example.

An inner width W2 of the insertion end accommodating part 235 of the yoke 230 can be, for example, A+0.1, and an outer width W1 of the insertion end portion 255 of the tooth 250 can be, for example, A−0.1. The outer width W1 of the insertion end portion 255 is less than the inner width W2 of the insertion end accommodating part 235.

An outer width W5 of the tooth 250 (tooth body 253) can be B−0.05, and an inner width W6 of the tooth insulating portion 361 of the tooth insulator 351 can be B+0.05, for example. The outer width W5 of the tooth body 253 is less than the inner width W6 of the tooth insulating portion 361.

A gap or interval between the side surface portions 3142 of the yoke inner surface insulating part 314 of the yoke insulator 301 (inner width (W4)) can be C+0.02, and a gap (inner width (W3)) between the third sections 373 can be C−0.02, for example. The gap (W3) between the third sections 373 of the tooth insulator 351 is less than the gap (W4) between the side surface portions 3142 of the yoke inner surface insulating part 314.

In some examples the gap between the coupling protrusions 240 inserted between the side surface portions 3142 of the yoke inner surface insulating part 314 of the yoke insulator 301 can be C−0.05, for example.

When the insertion end portion 255 of the tooth 250 is inserted into the insertion end accommodating part 235 of the yoke 230 along the axial direction, the third section 373 of the assembly guide 370 of the yoke insulator 301 and the side surface portion 3142 of the yoke inner surface insulating part 314 have the first coupling tolerance therebetween, both circumferential sides with respect to a center line (CL) of the insertion end accommodating part 235 and the tooth 250 have the smallest clearance range.

Accordingly, the tooth 250 is axially moved along an axial center line by relative sliding between the assembly guide 370 and the yoke inner surface insulating part 314 to thereby suppress the insertion end portion 255 of the tooth 250 from being in contact with an inner surface of the insertion end accommodating part 235 of the yoke 230. This can facilitate coupling between the tooth 250 and the yoke 230.

In addition, as the third section 373 of the assembly guide 370 and the side surface portion 3142 of the yoke inner surface insulating part 314 have the first coupling tolerance therebetween, and the yoke 230 and the yoke inner surface insulating part 314 have the third coupling tolerance therebetween, the third section 373 and the fourth section 374 of the assembly guide 370 provide the effect of pressing (limiting) the side surface portion 3142 and the inner surface 3141 of the yoke inner surface insulating part 314 within a range of the first coupling tolerance as illustrated in FIG. 12.

As the yoke inner surface insulating part 314 is substantially in close contact with the inner surface of the yoke 230, separation or lifting from the inner surface of the yoke 230 can be prevented.

Figure 13:
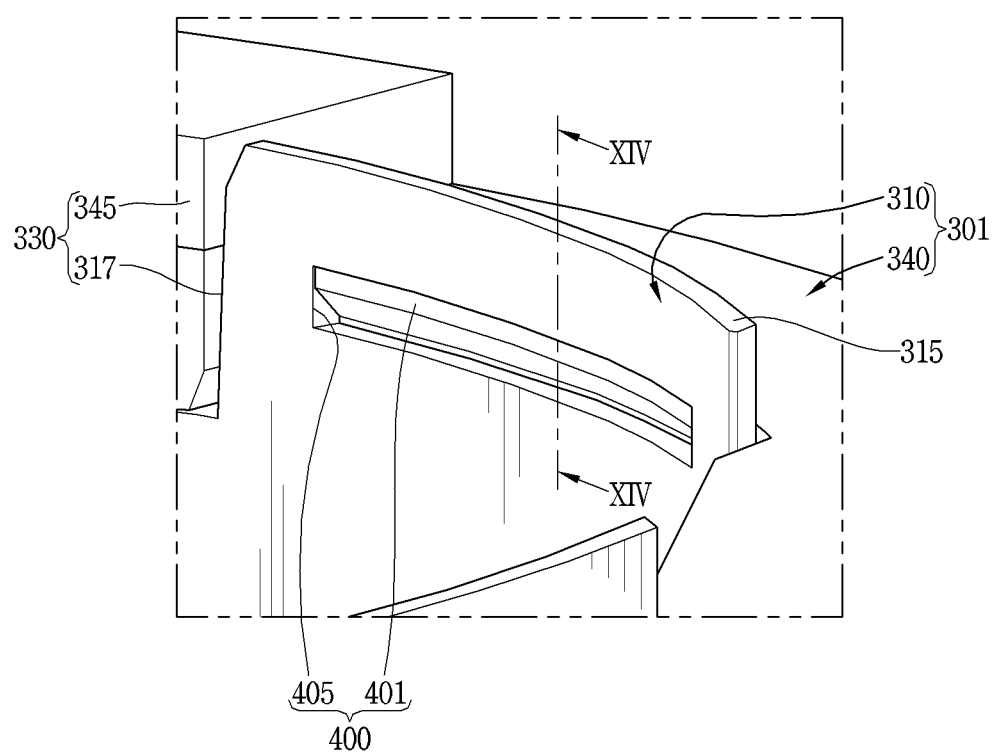
FIG. 13 is an enlarged view illustrating an example of a protruding end portion of a first yoke insulator of FIG. 4.
Figure 14:
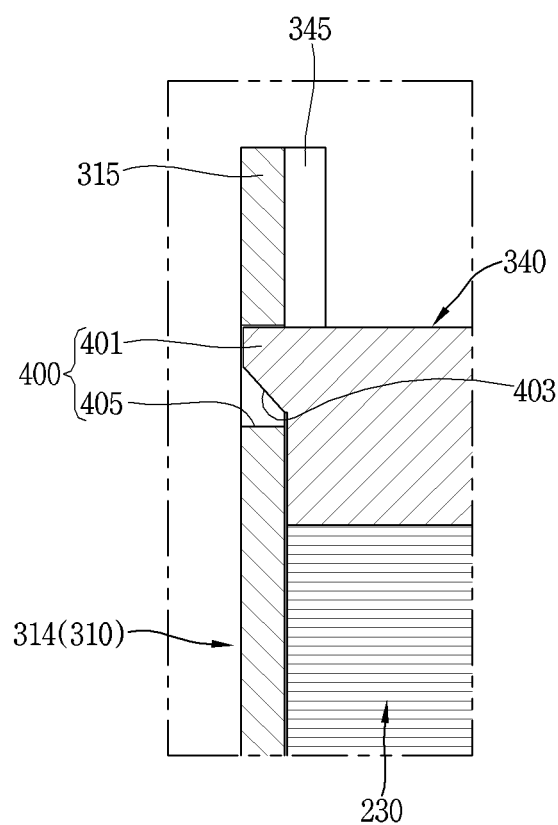
FIG. 14 is a cross-sectional view illustrating an example of a hook region of FIG. 13.

FIG. 13 is an enlarged view illustrating the protruding end portion of the first yoke insulator of FIG. 4, and FIG. 14 is a cross-sectional view illustrating an example of a hook region of FIG. 13. As described above, the first yoke insulator 310 is coupled from one side (lower side in the drawing) of the yoke 230 along the axial direction.

As illustrated in FIG. 13, the first yoke insulator 310 is provided with the yoke inner surface insulating part 314 that is coupled to the inner surface of the yoke 230.

The yoke inner surface insulating part 314 protrudes from an end (upper end) of the yoke 230 along the axial direction.

The second yoke insulator 340 is coupled to the protruding end portion 315 that protrudes from an end of the yoke 230.

The first yoke insulator 310 and the second yoke insulator 340 are provided with the engaging part 330 so as to be coupled together at a preset position.

The engaging part 330 includes the protruding portion 345 that protrudes from the second yoke insulator 340 and the accommodation groove 317 formed in a recessed manner so as to allow the protruding portion 345 to be accommodated in the first yoke insulator 310.

The protruding portion 345 protrudes inward of the yoke end insulating part 342 along a radial direction of the second yoke insulator 340.

A portion that protrudes radially inward from the yoke end insulating part 342 of the second yoke insulator 340 is inserted into the accommodation groove 317 of the first yoke insulator 310.

Accordingly, the first yoke insulator 310 and the second yoke insulator 340 can be accurately coupled to each other at a preset position along the circumferential direction.

The protruding portion 345 protrudes further from the yoke end insulating part 342 of the second yoke insulator 340 along the axial direction. A portion that axially protrudes from the yoke end insulating part 342 of the second yoke insulator 340 is not specifically shown in the drawing, but it is insertedly coupled to an accommodation groove defined at the inner surface of the housing 110, allowing the stator 210 to be accurately coupled to a preset position inside the housing 110.

The first yoke insulator 310 and the second yoke insulator 340 are provided with an engaging coupling part 400 configured to be engagingly coupled in the axial direction.

The engaging coupling part 400 includes a hook 401 protruding from one of mutual contact areas of the first yoke insulator 310 and the second yoke insulator 340, and a hook accommodating portion 405 formed at a remaining one of the mutual contact areas of the first yoke insulator 310 and the second yoke insulator 340 so as to allow the hook 401 to be accommodated therein.

As illustrated in FIG. 14, the hook 401 can protrude radially inward from the yoke end insulating part 342 of the second yoke insulator 340.

The hook 401 can have a long length in the circumferential direction.

The hook 401 can have an arcuate shape in the circumferential direction.

The hook accommodating portion 405 in which the hook 401 is accommodated can be formed through the first yoke insulator 310.

The hook accommodating portion 405 can be configured as a through-hole having a long length in the circumferential direction so as to allow the hook 401 to be accommodated therein.

The hook accommodating portion 405 has a rectangular cross section, and an inner upper surface of the hook accommodating portion 405 is engaged with the hook 401 in the axial direction, preventing the first yoke insulator 310 and the second yoke insulator 340 from being arbitrarily separated from each other.

The hook 401 can include a guide inclined surface 403 that is inclined with respect to the axial direction.

In some implementations, the guide inclined surface 403 of the hook 401 is inclined downwardly inward from a protruding end of the hook 401.

Accordingly, when coupling the second yoke insulator 340 to the yoke 230 in a state that the first yoke insulator 310 is coupled to the yoke 230, an upper surface of the first yoke insulator 310 and the guide inclined surface 403 of the hook 401 are bought into contact with each other. Then, the first yoke insulator 310 is elastically deformed inward along the radial direction, facilitating the coupling of the second yoke insulator 340.

When the hook 401 is accommodated in the hook accommodating portion 405, the first yoke insulator 310 returns to its initial position by its own elastic force and is disposed along the axial direction. In some examples as an upper surface of the hook 401 is in contact with an upper surface of the hook accommodating portion 405, the first yoke insulator 310 and the second yoke insulator 340 are engaged with each other in the axial direction, preventing axial separation between the first yoke insulator 310 and the second yoke insulator 340.

Hereinafter, an assembly process of the electric motor assembly according to the present disclosure will be described with reference to FIGS. 15 to 23.

Figure 15:
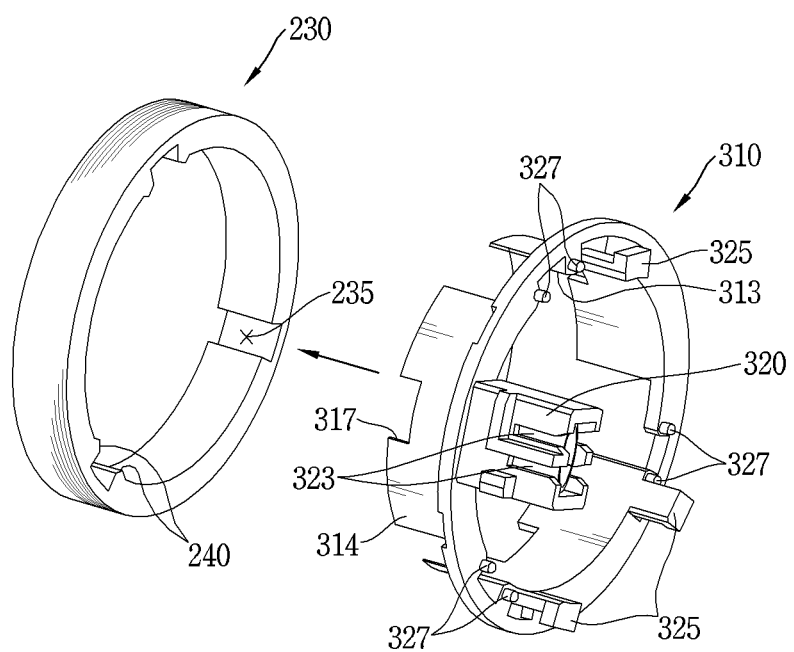
FIG. 15 is a disassembled perspective view illustrating the yoke and an example of a first yoke insulator of FIG. 2.
Figure 16:
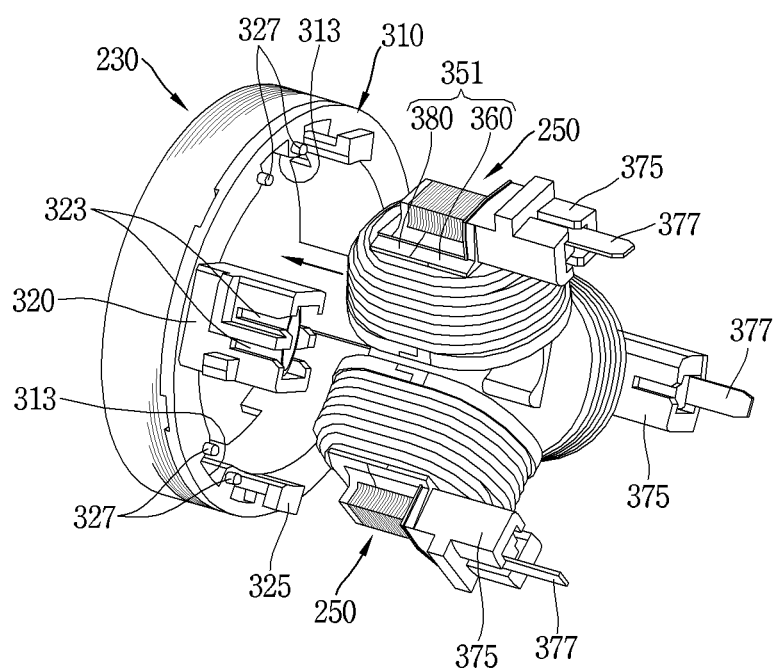
FIG. 16 is a perspective view illustrating an example state before the yoke and the tooth of FIG. 15 are coupled to each other.
Figure 17:
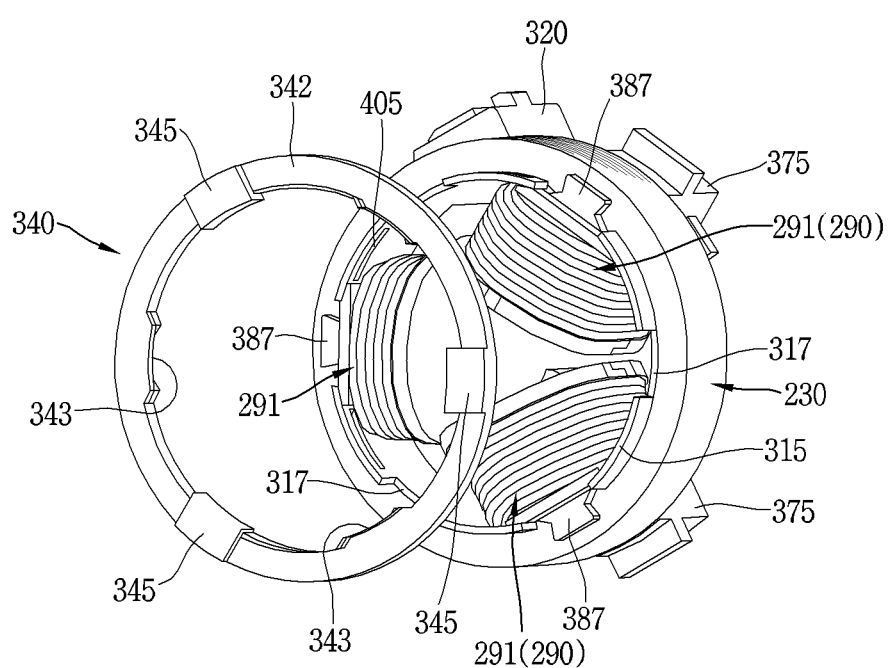
FIG. 17 is a perspective view illustrating an example state before a first yoke insulator and a second yoke insulator of FIG. 16 are coupled to each other.
Figure 18:
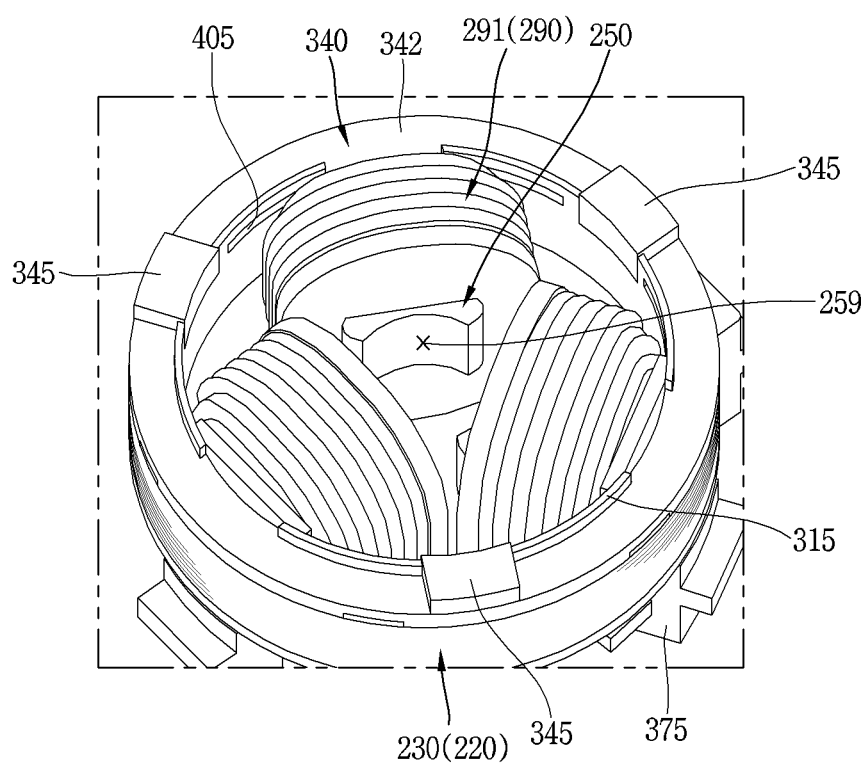
FIG. 18 is a perspective view illustrating an example of a coupled state between the first yoke insulator and the second yoke insulator of FIG. 17.

FIG. 15 is a disassembled perspective view illustrating the yoke and the first yoke insulator of FIG. 2, FIG. 16 is a perspective view illustrating an example state before the yoke and the tooth of FIG. 15 are coupled to each other, FIG. 17 is a perspective view illustrating an example state before the first yoke insulator and the second yoke insulator of FIG. 16 are coupled to each other, and FIG. 18 is a perspective view illustrating an example of a coupled state between the first yoke insulator and the second yoke insulator of FIG. 17.

When assembling the electric motor assembly having the configuration described above with reference to FIGS. 1 to 14, the first yoke insulator 310 is disposed such that spaces between each of the yoke inner surface insulating parts 314 of the first yoke insulator 310 correspond to the plurality of coupling protrusions 240 of the yoke 230, as illustrated in FIG. 15.

Then, ends of the yoke inner surface insulating parts 314 are inserted into the yoke 230 and are then pressed along the axial direction. Both side surface portions 3142 of the yoke inner surface insulating part 314 are in contact with side surfaces of the coupling protrusion 240 of the yoke 230 to be moved along the axial direction. As the relative movement (mutual coupling) continues, the yoke inner surface insulating parts 314 of the first yoke insulator 310 are brought into contact with an end of the yoke 230, then the coupling is completed.

Next, as illustrated in FIG. 16, the plurality of teeth 250 are coupled to the yoke 230 to which the first yoke insulator 310 is coupled. The insertion end portions 255 of the plurality of teeth 250 are respectively disposed at one sides of the insertion end accommodating parts 235 of the yoke 230 along the axial direction.

In some examples the assembly guide 370 of the tooth insulator 351 is inserted into a space of the yoke inner the yoke inner surface insulating part 314 of the yoke insulator 301 (first yoke insulator 310), and the third section 373 of the assembly guide 370 is coupled to the both side surface portions 3142 of the yoke inner surface insulating part 314 with the first coupling tolerance.

Accordingly, the plurality of teeth 250 are stably inserted into the insertion end accommodating parts 235 of the yoke 230, facilitating movement (insertion) along the axial direction without causing friction caused by a forced contact therebetween.

Once the coupling of the plurality of teeth 250 is completed, the insertion end insulating portions 387 of the second tooth insulators 380 protrude to the other ends of the yoke 230, as shown in FIG. 17. The protruding portions 345 of the second yoke insulator 340 are disposed to correspond to the respective accommodation grooves 317 of the first yoke insulator 310, and the second yoke insulator 340 is coupled to the protruding end portions 315 of the first yoke insulator 310 protruding to the other ends of the yoke 230. When the coupling of the second yoke insulator 340 is completed, the protruding portions 345 are inserted into the respective accommodation grooves 317.

As illustrated in FIG. 18, when the coupling of the second yoke insulator 340 is completed, the hook 401 of the second yoke insulator 340 is inserted into the hook accommodating portion 405 of the first yoke insulator 310. This can prevent the second yoke insulator 340 and the first yoke insulator 310 from being arbitrarily separated from each other.

Figure 19:
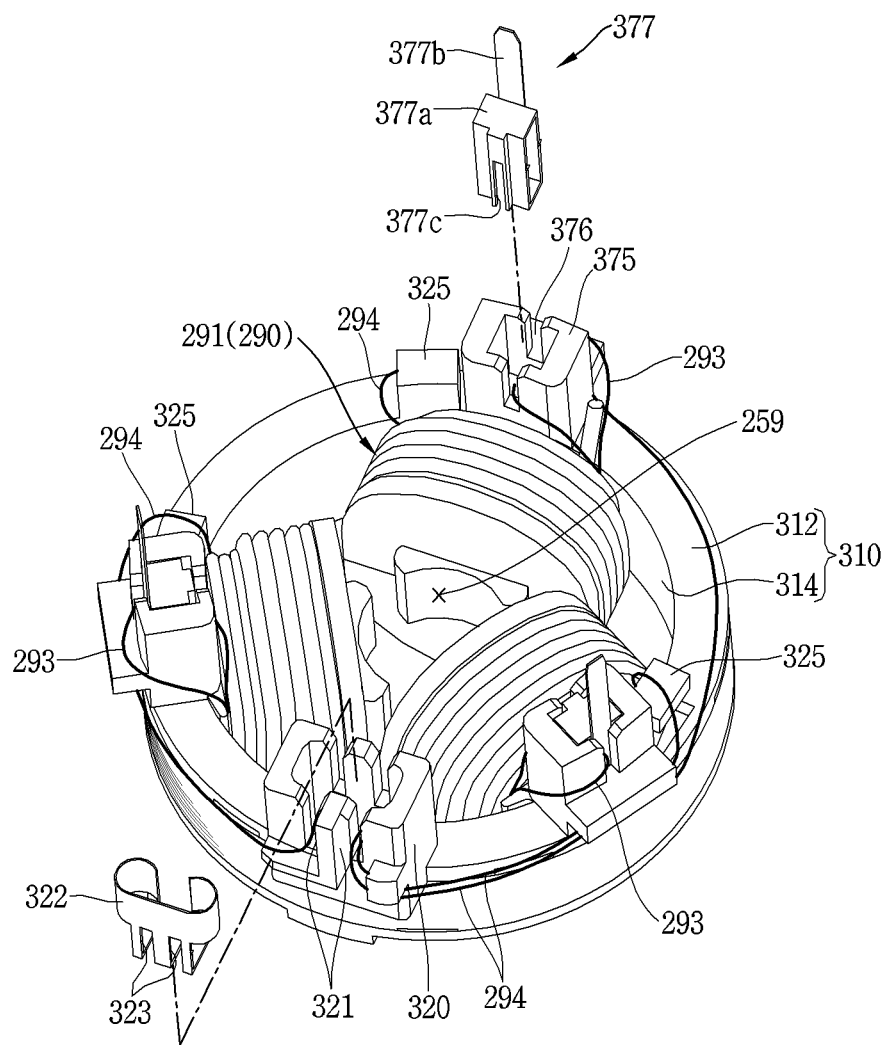
FIG. 19 is a view illustrating an example of a connection (wiring) process of a coil part of FIG. 18.

FIG. 19 is a view illustrating an example of a connection (wiring) process of the coil part of FIG. 18. As illustrated in FIG. 19, the plurality of coil parts 291 are wound on the plurality of teeth 250 so as to correspond to the respective phases (U-phase, V-phase, and W-phase) of the three-phase AC power supply. One ends (power wire 293) of the coil parts 291 are inserted into the respective power wire connection parts 375 provided at the first yoke insulator 310. The other ends (neutral wires 294) of the coil parts 291 are inserted into the respective neutral wire connection parts 320 provided at the yoke insulator 301 by passing through the corresponding connection hooks 325. Each of the PCB connection terminals 377 is insertedly coupled to one of the power wire connection parts 375 in which the respective power wires 293 are inserted. The power wires 293 are inserted into the respective slits 377c of the PCB connection terminals 377 so as to be electrically connected to the PCB connection terminals 377, respectively.

Neutral wire connection conductors 322 are respectively inserted into the neutral wire connection parts 320 in which the respective neutral wires 294 of the coil parts 291 are inserted. The neutral wire connection conductors 322 are made of an electric conductor, and are provided with a plurality of slits 323 in which the neutral wires 294 are inserted. The neutral wires 294 are electrically connected to the neutral wire connection conductors 322, respectively, when inserted into the respective slits 323. This can allow one ends (neutral wire 294) of the three coil parts 291 to be electrically connected to each other.

Figure 20:
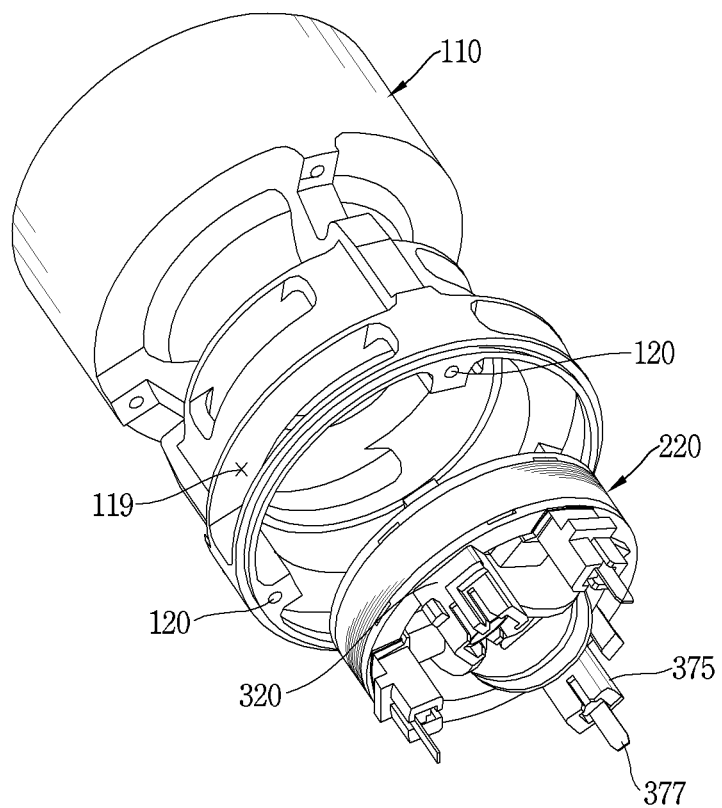
FIG. 20 is a perspective view illustrating an example state before a stator and a housing of FIG. 19 are coupled to each other.
Figure 21:
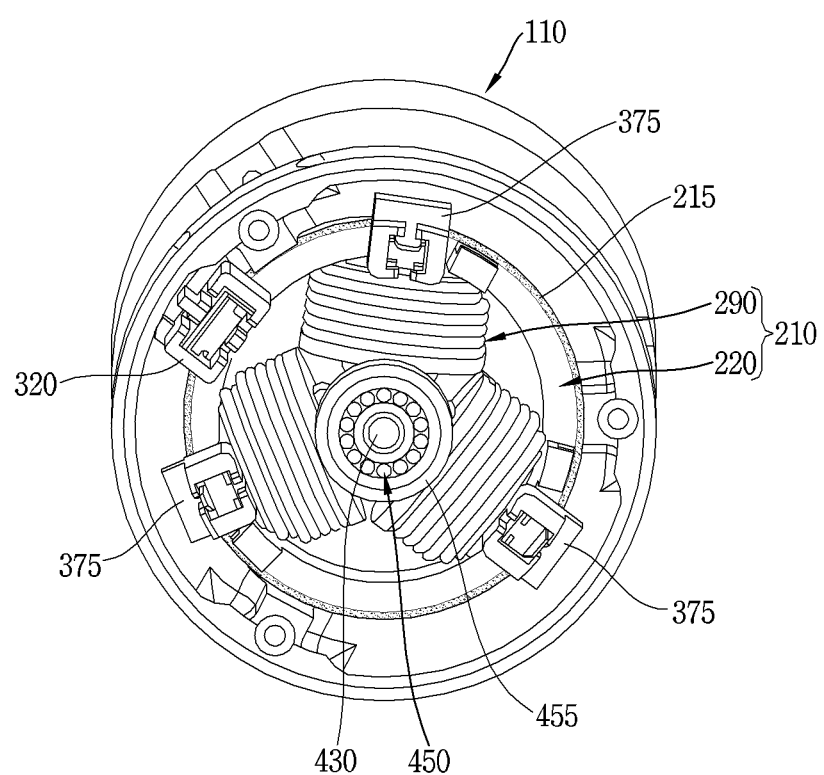
FIG. 21 is a bottom perspective view illustrating the housing with the stator of FIG. 20 inserted in the housing.

FIG. 20 is a perspective view illustrating an example state before the stator and the housing of FIG. 19 are coupled to each other, and FIG. 21 is a bottom perspective view illustrating the housing with the stator of FIG. 20 inserted into the housing. As illustrated in FIG. 20, the stator 210 can be insertedly coupled to an inside of the housing 110. The stator 210 can be insertedly coupled to an inside of the stator accommodating portion 112 of the housing 110 along the axial direction. Although not specifically illustrated in the drawing, the protruding portions 345 of the second yoke insulator 340 of the stator 210 are respectively inserted into the accommodating grooves provided in the housing 110, allowing the housing 110 and the stator 210 to be accurately assembled and coupled to a predetermined position.

As illustrated in FIG. 21, the stator 210 that is inserted into the predetermined position can be fixedly coupled to the housing 110. A stator fixing portion 215 can be provided at a mutual contact area between the stator 210 and the housing 110. The stator fixing portion 215 can be bonded by an adhesive, for example. Accordingly, the stator 210 can be fixedly coupled to the inner surface of the housing 110. The rotor 420 can be insertedly coupled to an inside of the stator 210. The bearing 450 can be provided at the rotating shaft 430 of the rotor 420.

Figure 22:
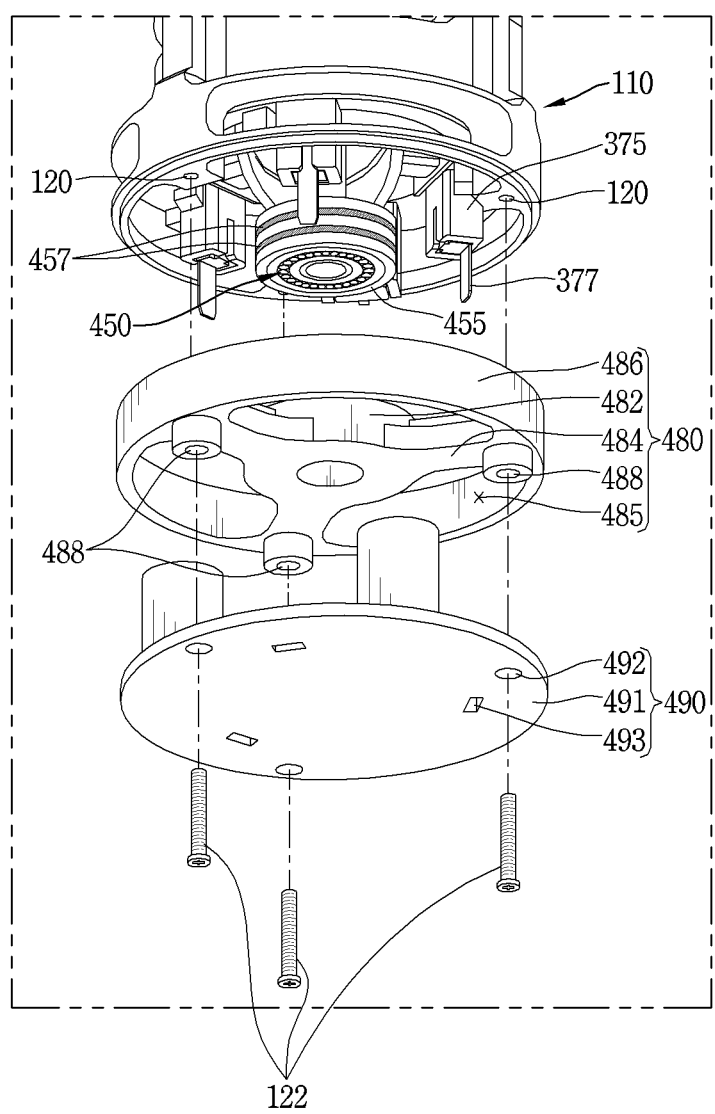
FIG. 22 is a perspective view illustrating an example state before the housing, a bracket, and a PCB of FIG. 21 are coupled to each other.

FIG. 22 is a perspective view illustrating an example state before the housing, the bracket, and the PCB of FIG. 21 are coupled to each other. As illustrated in FIG. 22, the bracket 480 is disposed below the housing 110. The bearing 450 that is coupled to the rotating shaft 430 is inserted into the bearing accommodating portion 482 of the bracket 480. The bracket 480 includes fixing member coupling portions 488 so that the bracket 480 and the housing 110 are coupled to each other by the fixing members 122. The fixing member coupling portions 488 respectively communicate with fixing member coupling portions 120 that are provided at the housing 110.

The PCB 490 is coupled to one side of the bracket 480 (lower side in the drawing). The PCB 490 can be provided with the connection terminal insertion portion 493 in which the PCB connection terminal 377 is inserted. The PCB connection terminal insertion portion 493 can be formed through the PCB 490, for example. The PCB connection terminal 377 that is inserted into the PCB connection terminal insertion portion 493 can be fixed by soldering, for example.

When the fixing members 122 are inserted into the fixing member insertion holes 492 of the PCB 490 along the axial direction, the fixing members 122 are sequentially coupled to the fixing member coupling portions 488 of the bracket 480 and the housing 110 that are in communication with each other.

As described above, the impeller 130 is accommodated and coupled to another side (upper side in the drawing) of the housing 110. Then, the second guide vane 152 in which the bearing 450 is disposed and the first guide vane 151 are accommodated in the housing 110 to be coupled.

When operation is started and power is applied to the stator 210, a magnetic field produced by the stator coil 290 and a magnetic field of the permanent magnet 440 interact with each other, causing the rotor 420 to rotate about the rotating shaft 430. When the rotating shaft 430 rotates, the impeller 130 is accommodated, and air at an upstream side of the impeller 130 is discharged to a downstream side of the impeller 130 by passing therethrough.

In some examples since air outside the housing 110, which has a relatively low temperature, passes through the stator 210 and the rotor 420 first, cooling of the stator 210 and the rotor 420 can be facilitated.

As the stator coil 290 and the permanent magnet 440 are cooled by the air with a relatively low temperature, a relatively low temperature can be maintained during the operation. This can enable the output of the electric motor assembly to be improved.

According to the electric motor assembly of this implementation, as the stator 210 and the rotor 420 have a relatively short (small) axial length, flow resistance of air moved by the impeller 130 can be significantly reduced.

As a result, noise can be remarkably reduced to thereby achieve quiet operation.

Further, as the stator 210 and the rotor 420 have the relatively short axial length, flow resistance can be remarkably reduced. Thus, a decrease in air volume of air moved by the impeller 130 can be significantly suppressed.

Hereinafter, an electric motor assembly according to another implementation of the present disclosure will be described with reference to FIGS. 23 to 25.

Figure 23:
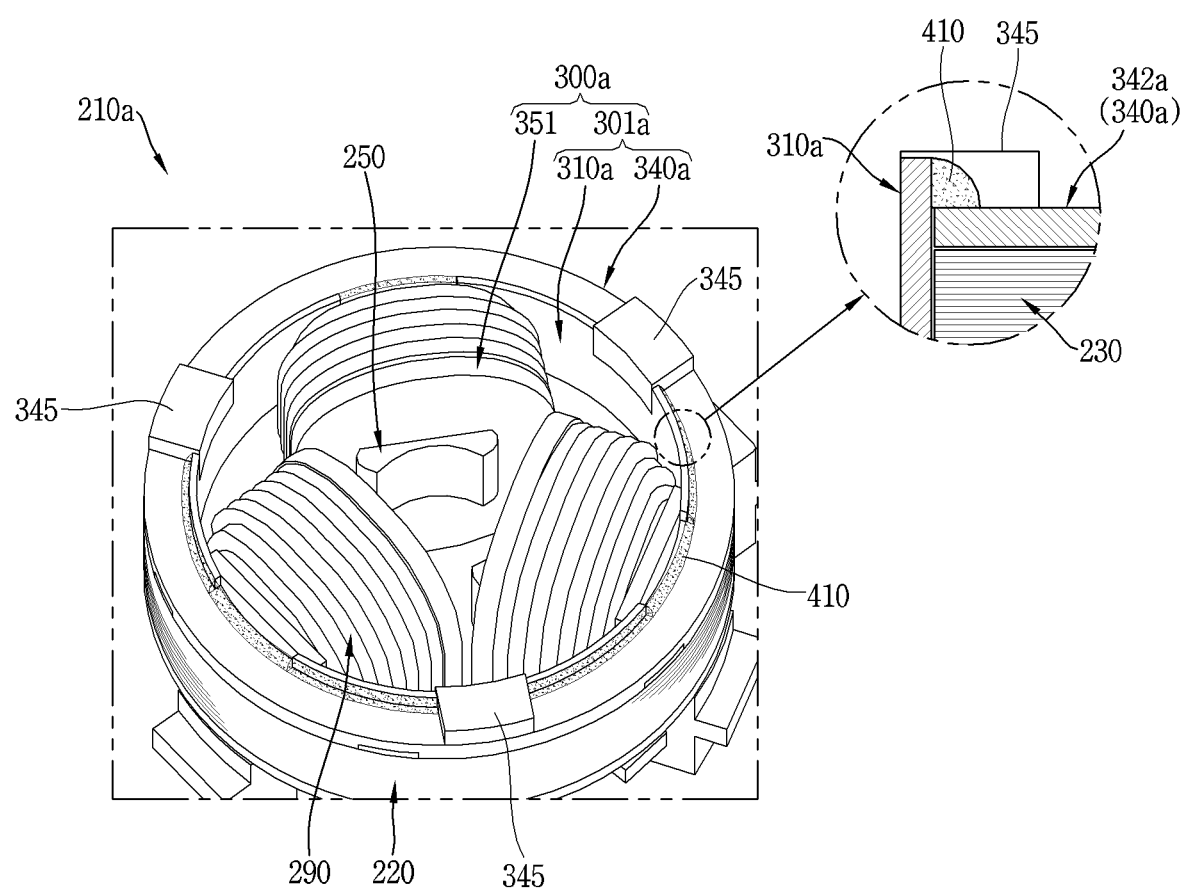
FIG. 23 is a view illustrating an example of coupling between a first yoke insulator and a second yoke insulator of an electric motor assembly.

FIG. 23 is a view illustrating an example of coupling between a first yoke insulator and a second yoke insulator of an electric motor assembly. The electric motor assembly of this example includes an impeller 130, a stator 210a, and a rotor 420 as in the example described above.

The stator 210a includes a stator core 220, a stator coil 290 wound around the stator core 220, and an insulator 300a disposed between the stator core 220 and the stator coil 290.

The stator core 220 includes a yoke 230 having a ring shape and a plurality of teeth 250 radially coupled to an inner surface of the yoke 230.

The insulator 300a includes a yoke insulator 301a that is coupled to the yoke 230 and tooth insulators 351 that are respectively coupled to the plurality of teeth 250.

The yoke insulator 301a includes a first yoke insulator 310a and a second yoke insulator 340a that are coupled to each other along an axial direction.

The first yoke insulator 310a includes a yoke end insulating part 312 that insulates an end of the yoke 230 and a yoke inner surface insulating part 314 that axially extends from the yoke end insulating part 312 to insulate an inner surface of the yoke 230. The yoke inner surface insulating part 314 has an axial length greater than an axial length (thickness) of the yoke 230. Accordingly, the yoke inner surface insulating part 314 is configured to be inserted from one end of the yoke 230 along the axial direction to be coupled to the inner surface thereof, and to protrude from another end of the yoke 230.

The second yoke insulator 340a includes a yoke end insulating part 342a that insulates an end of the yoke 230.

In some implementations, the first yoke insulator 310a and the second yoke insulator 340a can be integrally fixed and coupled together by an adhesive.

As illustrated in FIG. 23, when the first yoke insulator 310a is coupled from a first side (e.g., the lower side in the drawing) of the yoke 230, the yoke inner surface insulating part 314 of the first yoke insulator 310a protrudes to a second side of the yoke 230 opposite to the first side. The second yoke insulator 340a is coupled to a protruding end portion 315 that protrudes to the second side of the yoke 230.

The protruding end portion 315 of the yoke inner surface insulating part 314 protrudes from the second yoke insulator 340a by a predetermined length along the axial direction.

An adhesive is applied to a boundary region between an outer surface of the protruding end portion 315 and the second yoke insulator 340a to form a bonding portion 410. Accordingly, the first yoke insulator 310a (the yoke inner surface insulating part 314) and the second yoke insulator 340a can be integrally bonded (fixed) together. The bonding portion 410 can have a ring shape along a circumferential direction of the second yoke insulator 340a.

Figure 24:
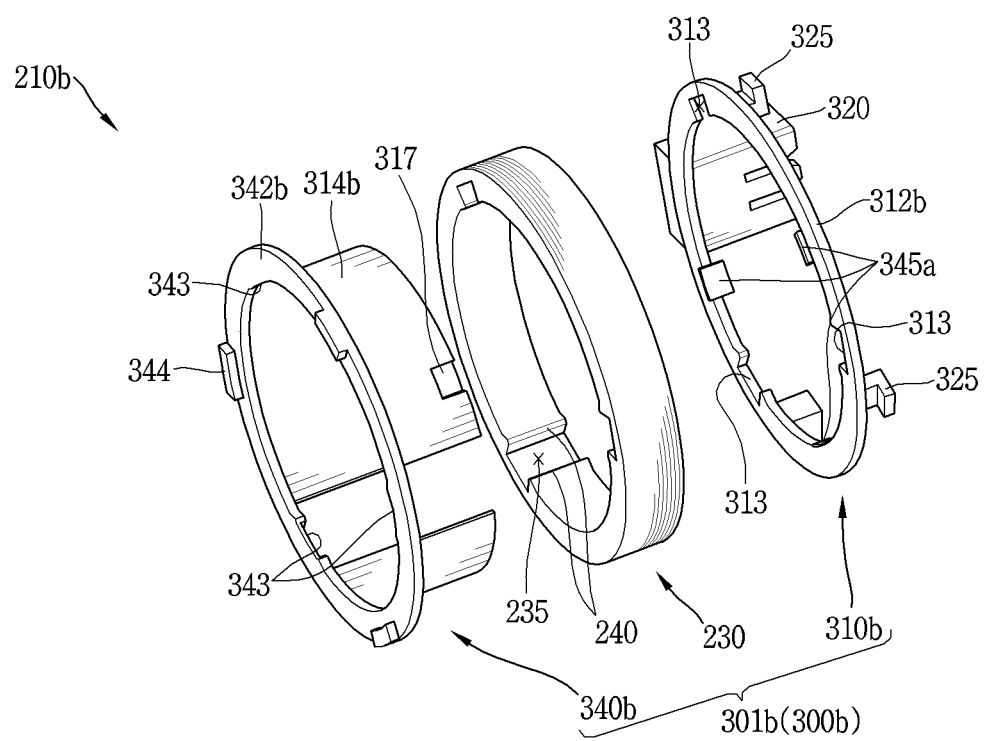
FIG. 24 is a perspective view illustrating an example state before a first yoke insulator and a second yoke insulator of an electric motor assembly are coupled to each other.

FIG. 24 is a perspective view illustrating an example state before a first yoke insulator and a second yoke insulator of an electric motor assembly are coupled to each other. An electric motor assembly of this example includes an impeller 130, a stator 210b, and a rotor 420, as in the examples described above.

The stator 210b includes a stator core 220, a stator coil 290 wound around the stator core 220, and an insulator 300b disposed between the stator core 220 and the stator coil 290.

The stator core 220 includes a yoke 230 having a ring shape and a plurality of teeth 250 coupled to the yoke 230. A plurality of insertion end accommodating parts 235 to which the plurality of teeth 250 are respectively coupled along an axial direction are formed in the yoke 230.

The insulator 300b includes a yoke insulator 301b that is coupled to the yoke 230 and tooth insulators 351 that are respectively coupled to the plurality of teeth 250.

As illustrated in FIG. 24, the yoke insulator 301b includes a first yoke insulator 310b and a second yoke insulator 340b that are coupled to each other along the axial direction, for example.

The first yoke insulator 310b includes a first yoke end insulating part 312b that is coupled to one side (right side in the drawing) of the yoke 230 along the axial direction. Slots 313 in which insertion end portions 255 of the plurality of teeth 250 are inserted are formed through the first yoke end insulating part 312b in the axial direction.

The first yoke end insulating part 312b is provided with protruding portions 345a that are radially protruding inward.

The first yoke insulator 310b includes neutral wire connection parts 320 to which one ends (neutral wires 294) of a plurality of coil parts 291 of the stator coil 290 are respectively connected. Each of the neutral wire connection parts 320 protrudes from the first yoke end insulating part 312b along the axial direction. The first yoke insulator 310b is provided with connection hooks 325 for connecting the neutral wires 294 of the plurality of coil parts 291. Each of the connection hooks 325 axially protrudes from the first yoke end insulating part 312b of the first yoke insulator 310b and is bent to protrude outward in a radial direction.

The second yoke insulator 340b includes a second yoke end insulating part 342b that is coupled to another end (left in the drawing) of the yoke 230 along the axial direction and yoke inner surface insulating parts 314b axially protruding from the second yoke end insulating part 342b. The yoke inner surface insulating parts 314b are disposed to be spaced apart from each other along a circumferential direction so as to be respectively coupled to both sides of the plurality of insertion end accommodating parts 235. The yoke inner surface insulating parts 314b each includes an accommodation groove 317 to which one of the protruding portions 345a of the first yoke insulator 310b is accommodatingly coupled.

The second yoke end insulating part 342b of the second yoke insulator 340b is provided with a protruding portion 344 that protrudes outward in the axial direction. Accordingly, the second yoke insulator 340b can be accurately coupled to an inside of the housing 110 at a predetermined position.

The second yoke end insulating part 342b includes accommodating portions 343 in which insertion end insulating portions 387 of a second tooth insulator 380 that are axially protrude from the yoke 230 are respectively accommodated. The accommodating portions 343 are provided at an inner surface of the second yoke end insulating part 342b to be recessed in the axial direction.

Figure 25:
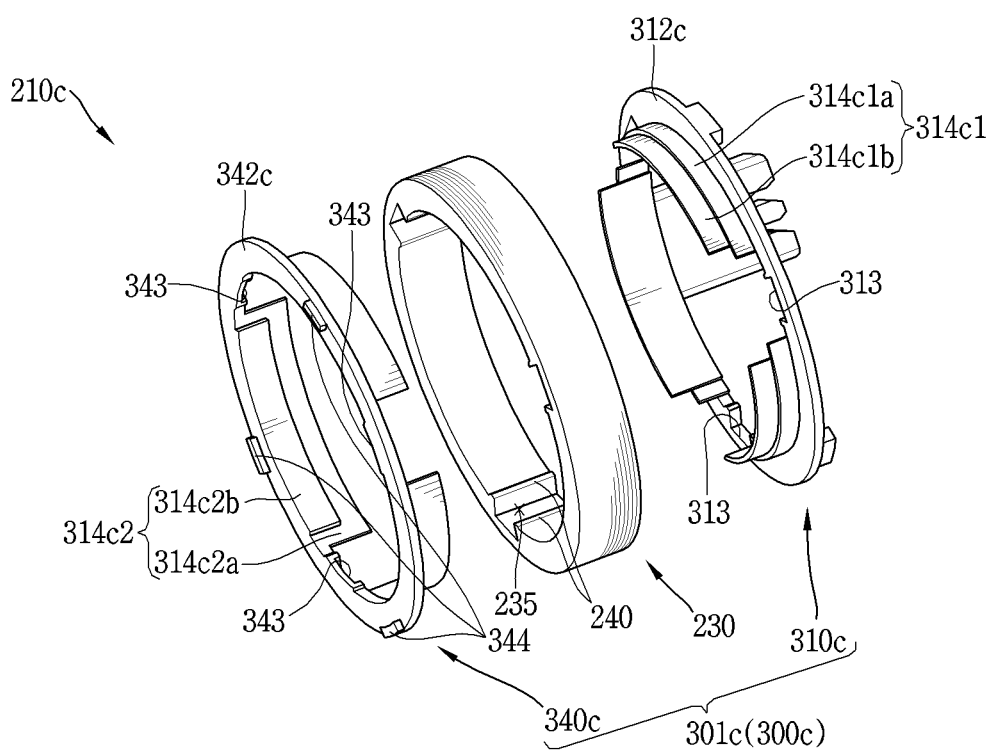
FIG. 25 is a perspective view illustrating an example state before a first yoke insulator and a second yoke insulator of an electric motor assembly are coupled to each other.

FIG. 25 is a perspective view illustrating a state before a first yoke insulator and a second yoke insulator of an electric motor assembly are coupled to each other. An electric motor assembly of this example includes an impeller 130, a stator 210c, and a rotor 420, as in the examples described above.

The stator 210c includes a stator core 220, a stator coil 290, and an insulator 300c.

The stator core 220 includes a yoke 230 having a ring shape and a plurality of teeth 250 that are coupled to the yoke 230.

The yoke 230 is provided with a plurality of insertion end accommodating parts 235 to which the plurality of teeth 250 are respectively coupled along an axial direction.

The insulator 300c includes a yoke insulator 301c that is coupled to the yoke 230 and tooth insulators 351 that are respectively coupled to the plurality of teeth 250.

As illustrated in FIG. 25, the yoke insulator 301c includes, for example, a first yoke insulator 310c and a second yoke insulator 340c that are coupled face-to-face in the axial direction.

The first yoke insulator 310c and the second yoke insulator 340c of the electric motor assembly of this implementation can be in surface-to-surface contact with each other inside the yoke 230.

More specifically, the first yoke insulator 310c includes a first yoke end insulating part 312c that blocks one end (left end in the drawing) of the yoke 230 along the axial direction and a first yoke inner surface insulating part 314c1 that extends from the first yoke end insulating part 312c along the axial direction so as to be inserted into the yoke 230.

Slots 313 in which insertion end portions 255 of the plurality of teeth 250 are respectively inserted are formed through the first yoke end insulating part 312c in the axial direction.

The second yoke insulator 340c includes a second yoke end insulating part 342c that blocks another end (right end in the drawing) of the yoke 230 along the axial direction and a second yoke inner surface insulating part 314c2 that axially extends from the second yoke end insulating part 342c.

The second yoke end insulating part 342c is provided with accommodating portions 343 in which respective insertion end insulating portions 387 of a second tooth insulator 380 that protrude from an end of the yoke 230 are accommodated. Each of the accommodating portions 343 is recessed from an inner surface of the second yoke end insulating part 342c in the axial direction.

The second yoke end insulating part 342c is provided with protruding portions 344 that protrude outward along the axial direction.

In some examples the first yoke inner surface insulating part 314c1 and the second yoke inner surface insulating part 314c2 can overlap with each other in a radial direction.

More specifically, the first yoke inner surface insulating part 314c1 can include a first outer insulating portion 314c1a and a first inner insulating portion 314c1b having different sizes along the radial direction.

The first inner insulating portion 314c1b of the first yoke inner surface insulating part 314c1 can be disposed inside the first outer insulating portion 314c1a with a reduced size in axial and circumferential directions.

The second yoke inner surface insulating part 314c2 can include a second outer insulating portion 314c2a and a second inner insulating portion 314c2b having different sizes along the radial direction.

The second outer insulating portion 314c2a has a circumferential length corresponding to a circumferential length of the first outer insulating portion 314c1a.

The circumferential length of the second outer insulating portion 314c2a is the same as the circumferential length of the first outer insulating portion 314c1a.

The second inner insulating portion 314c2b has the same circumferential length as the first inner insulating portion 314c1b.

The circumferential length of the second inner insulating portion 314c2b is the same as the circumferential length of the first inner insulating portion 314c1b.

The second inner insulating portion 314c2b protrudes longer than the second outer insulating portion 314c2a in the axial direction.

An end of the second inner insulating portion 314c2b has a length that can be in surface-to-surface contact with an end of the first inner insulating portion 314c1b.

The second outer insulating portion 314c2a has an axial length that can be in surface-to-surface contact with an end of the first outer insulating portion 314c1a.

The second yoke insulator 340c includes neutral wire connection parts 320 to which neutral wires 294 of the plurality of coil parts 291 of the stator coil 290 are respectively coupled. Each of the neutral wire connection parts 320 of the second yoke insulator 340c protrudes along the axial direction.

With this configuration, the first yoke insulator 310c and the second yoke insulator 340c can be coupled to each other along the axial direction with the yoke 230 interposed therebetween.

When the first yoke insulator 310c and the second yoke insulator 340c are pressed to be close to each other, the second inner insulating portion 314c2b is inserted into the first outer insulating portion 314c1a and is brought into contact with an end of the first inner insulating portion 314c1b. In some examples the first outer insulating portion 314c1a is relatively moved at an outside of the second inner insulating portion 314c2b and comes in contact with an end of the second outer insulating portion 314c2a. Accordingly, the first outer insulating portion 314c1a and the second inner insulating portion 314c2b are coupled to each other in an overlapping manner.

In the foregoing, exemplary implementations of the present disclosure have been shown and described. However, the present disclosure can be implemented in various forms without departing from the spirit or essential characteristics thereof, and accordingly, it is intended that the implementations described above are not be limited by the detailed description provided herein.

Moreover, even if any implementation is not specifically disclosed in the foregoing detailed description, it should be broadly construed within the scope of the technical spirit, as defined in the accompanying claims. Furthermore, all modifications and variations included within the technical scope of the claims and their equivalents should be covered by the accompanying claims.

What is claimed is:

1. A method for manufacturing an electric motor assembly that comprises a stator provided with a stator core, a stator coil wound around the stator core, an insulator interposed between the stator core and the stator coil, and a rotor rotatable relative to the stator, wherein the stator core comprises a yoke having a ring shape and a plurality of teeth coupled to an inner surface of the yoke, and wherein the insulator comprises a yoke insulator having a first yoke insulator and a second yoke insulator coupled to both sides of the yoke in an axial direction, and tooth insulators each having a first tooth insulator and a second tooth insulator coupled to both sides of each of the plurality of teeth, respectively, in the axial direction, the method comprising:
   coupling the first tooth insulator and the second tooth insulator to each of the plurality of teeth;
   winding coil parts of the stator coil around the tooth insulators, respectively;
   coupling the first yoke insulator to one side of the yoke;
   coupling the plurality of teeth to the yoke and the first yoke insulator; and
   coupling the second yoke insulator to another side of the yoke.

2. The method of claim 1, wherein the tooth insulators comprise power wire connection parts to which an end of the coil parts of the stator coil are connected, respectively,
   wherein the first yoke insulator comprises neutral wire connection parts to which another end of the coil parts of the stator coil are connected simultaneously, and
   wherein the method further comprises, after the second yoke insulator is coupled to the another side of the yoke, providing wiring of the stator coil by connecting the end of the coil parts to the power wire connection parts and connecting the another end of the coil parts to the neutral wire connection parts.

3. The method of claim 2, wherein:
   the first yoke insulator comprises a yoke end insulating part configured to insulate one end of the yoke, and a yoke inner surface insulating part configured to insulate an inner surface of the yoke,
   the second yoke insulator comprises a yoke end insulating part configured to insulate another end of the yoke,
   the yoke inner surface insulating part comprises a protruding end portion protruding from the another end of the yoke, and
   the second yoke insulator is coupled so that the protruding end portion of the first yoke insulator is accommodated therein.

4. The method of claim 3, wherein a hook protrudes from one of mutual contact surfaces of the first yoke insulator and the second yoke insulator, wherein a hook accommodating portion is disposed in another one of the mutual contact surfaces, and wherein the hook is accommodated into the hook accommodating portion based on the first yoke insulator and the second yoke insulator being coupled to each other.

5. The method of claim 3, further comprising applying an adhesive to a boundary region between an outer surface of the protruding end portion and the second yoke insulator to thereby form a bonding portion through which the first yoke insulator and the second yoke insulator are coupled to each other.

6. The method of claim 3, wherein:
the second yoke insulator comprises a protruding portion protruding radially inward therefrom,
the yoke inner surface insulating part of the first yoke insulator defines an accommodation groove in which the protruding portion is accommodated, and
the protruding portion is accommodated into the accommodation groove based on the second yoke insulator being coupled to the another side of the yoke.

7. The method of claim 6, wherein the electric motor assembly further comprises an impeller connected to a rotating shaft of the rotor, and a housing in which the stator and the impeller are accommodated, and
wherein the stator is inserted into the housing after the wiring of the stator coil.

8. The method of claim 7, wherein the protruding portion of the second yoke insulator protrudes in the axial direction to be inserted at a preset position based on the stator being inserted into the housing, and
wherein a stator fixing portion configured to fix the stator to the housing is provided at a mutual contact area between the stator and the housing.

9. The method of claim 8, wherein the stator fixing portion is formed by applying an adhesive to the mutual contact area between the stator and the housing.

10. The method of claim 8, wherein the housing comprises a stator accommodating portion for accommodating the stator, an impeller accommodating portion for accommodating the impeller, and a communication portion having a smaller diameter than the stator accommodating portion and the impeller accommodating portion, and
wherein the rotor is inserted into the stator after forming the stator fixing portion.

11. The method of claim 10, wherein:
a plurality of bearings are coupled to both ends of the rotating shaft of the rotor, respectively,
a bracket having a bearing accommodating portion is coupled to an upstream side of the stator, based on a flow direction of air moved by the impeller, and
a guide vane having a bearing accommodating portion is coupled to a downstream side of the impeller.

12. The method of claim 11, wherein a PCB is coupled to an upstream side of the bracket after the bracket having the bearing accommodating portion is coupled to the upstream side of the stator, based on the flow direction of the air moved by the impeller.

13. The method of claim 12, wherein fixing member coupling portions are provided in the housing and the bracket, and a fixing member insertion hole is defined through the PCB such that a fixing member is inserted into the fixing member coupling portions through the fixing member insertion hole based on the PCB being coupled to the upstream side of the bracket.

14. The method of claim 3, wherein:
the plurality of teeth comprise insertion end portions, respectively, coupled to the yoke,
the yoke comprises insertion end accommodating portions into which the insertion end portions of the plurality of teeth are inserted,
the second tooth insulator comprises insertion end insulating portions configured to insulate the insertion end portions,
the insertion end insulating portions protrude from the yoke, and
the insertion end insulating portions are accommodated in accommodating portions of the second yoke insulator based on the second yoke insulator being coupled to the another side of the yoke.

15. The method of claim 14, wherein the yoke comprises a plurality of coupling protrusions protruding from the inner surface of the yoke and disposed on both sides of each tooth, respectively, and
wherein yoke inner surface insulating portions are inserted between the coupling protrusions based on the first yoke insulator being coupled to the one side of the yoke.

16. The method of claim 15, wherein:
a first coupling tolerance defined between the yoke insulator and the tooth insulators is less than a second coupling tolerance defined between the yoke and the teeth,
the first yoke insulator is coupled to the one side of the yoke, and
the teeth are axially guided by relative movement of the first yoke insulator and the tooth insulators based on the plurality of teeth being coupled to the yoke and the first yoke insulator.

17. The method of claim 2, wherein:
each of the power wire connection parts defines a cut-out portion that is cut in the axial direction,
the end of the coil parts is inserted into the cut-out portion, and
a printed circuit board (PCB) connection terminal made of an electric conductor is inserted into the power wire connection part to be electrically connected to the end of the coil parts.

18. The method of claim 2, wherein the neutral wire connection parts comprise a plurality of slits in which the another end of the coil parts are inserted, and
wherein neutral wire connection conductors made of an electric conductor are inserted into the neutral wire connection parts to be electrically connected to the another end of the coil parts, respectively.

19. The method of claim 1, wherein the first yoke insulator and the first tooth insulator are provided, respectively, with a position fixing protrusion and a position fixing protrusion accommodating portion, and wherein the position fixing protrusion is accommodated in the position fixing protrusion accommodating portion in an engaged manner along an axial direction based on the first yoke insulator being coupled to the one side of the yoke.

* * * * *